(12) United States Patent
Rahman et al.

(10) Patent No.: US 11,888,557 B2
(45) Date of Patent: Jan. 30, 2024

(54) METHOD AND APPARATUS FOR PORT SELECTION IN WIRELESS COMMUNICATION SYSTEMS

(71) Applicant: Samsung Electronics Co., Ltd., Suwon-si (KR)

(72) Inventors: Md. Saifur Rahman, Plano, TX (US); Eko Onggosanusi, Coppell, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/179,299

(22) Filed: Mar. 6, 2023

(65) Prior Publication Data

US 2023/0208482 A1   Jun. 29, 2023

Related U.S. Application Data

(63) Continuation of application No. 17/011,914, filed on Sep. 3, 2020, now Pat. No. 11,601,169.

(60) Provisional application No. 62/902,094, filed on Sep. 18, 2019, provisional application No. 62/897,905, filed on Sep. 9, 2019.

(51) Int. Cl.
| | |
|---|---|
| *H04B 7/06* | (2006.01) |
| *H04B 7/0456* | (2017.01) |
| *H04W 80/08* | (2009.01) |

(52) U.S. Cl.
CPC ......... *H04B 7/0482* (2013.01); *H04B 7/0626* (2013.01); *H04B 7/0634* (2013.01); *H04B 7/0639* (2013.01); *H04W 80/08* (2013.01)

(58) Field of Classification Search
CPC ......... H04B 7/04; H04B 7/06; H04B 7/0456; H04B 7/0482; H04B 7/0626; H04B 7/0639; H04B 17/00; H04B 17/309; H04L 1/00; H04L 5/00; H04L 5/0048; H04L 5/0057;

(Continued)

(56) References Cited

U.S. PATENT DOCUMENTS

2018/0138950 A1   5/2018  Rahman
2018/0309490 A1*  10/2018  Rahman ............... H04B 7/0482
(Continued)

OTHER PUBLICATIONS

Nokia, "Remaining details on CSI reporting for Type II and Type I codebook" Prague, CZ, Oct. 9-13, 2017 (Year: 2017).

(Continued)

*Primary Examiner* — Shawkat M Ali

(57) ABSTRACT

A method for operating a user equipment (UE) comprises receiving configuration information for a CSI report. The configuration information includes information to: configure a codebook and parameters for the codebook, the codebook comprising a precoding matrix indicator (PMI) indicating a set of components S to represent $N_3$ precoding matrices, where $N_3 \geq 1$; and partition the PMI into two subsets, a first PMI subset indicating a first subset of components S1 from the set of components S, and a second PMI subset indicating a second subset of components S2 from the set of components S different from the first subset of components S1. The method further comprises determining the CSI report based on the configuration information, the CSI report including the second PMI subset indicating the second subset of components S2, and transmitting the determined CSI report over an uplink (UL) channel.

15 Claims, 13 Drawing Sheets

(58) Field of Classification Search
CPC ..... H04W 24/10; H04W 28/04; H04W 72/04; H04W 72/06; H04W 72/10; H04W 80/08
USPC ......... 370/329–333; 375/219, 260, 267, 295, 375/316

See application file for complete search history.

(56) References Cited

U.S. PATENT DOCUMENTS

| | | | |
|---|---|---|---|
| 2018/0351617 A1 | 12/2018 | Liu | |
| 2019/0253181 A1 | 8/2019 | Rahman | |
| 2019/0260453 A1* | 8/2019 | Huang | H04B 7/0456 |
| 2021/0051508 A1 | 2/2021 | Chung | |
| 2023/0208494 A1* | 6/2023 | Großmann | H04B 7/0486 370/329 |

OTHER PUBLICATIONS

"3rd Generation Partnership Project; Technical Specification Group Radio Access Network; Evolved Universal Terrestrial Radio Access (E-UTRA); Physical channels and modulation (Release 15)", 3GPP TS 36.211 V15.6.0, Jun. 2019, 239 pages.

"3rd Generation Partnership Project; Technical Specification Group Radio Access Network; Evolved Universal Terrestrial Radio Access (E-UTRA); Multiplexing and channel coding (Release 15)", 3GPP TS 36.212 V15.6.0, Jun. 2019, 246 pages.

"3rd Generation Partnership Project; Technical Specification Group Radio Access Network; Evolved Universal Terrestrial Radio Access (E-UTRA); Physical layer procedures (Release 15)", 3GPP TS 36.213 V15.6.0, Jun. 2019, 551 pages.

"3rd Generation Partnership Project; Technical Specification Group Radio Access Network; Evolved Universal Terrestrial Radio Access (E-UTRA); Medium Access Control (MAC) protocol specification (Release 15)", 3GPP TS 36.321 V15.6.0, Jun. 2019, 133 pages.

"3rd Generation Partnership Project; Technical Specification Group Radio Access Network; Evolved Universal Terrestrial Radio Access (E-UTRA); Radio Resource Control (RRC); Protocol specification (Release 15)", 3GPP TS 36.331 V15.6.0, Jun. 2019, 960 pages.

"3rd Generation Partnership Project; Technical Specification Group Services and System Aspects; Feasibility Study on New Services and Markets Technology Enablers; Stage 1 (Release 14)", 3GPP Tr 22.891 V1.2.0, Nov. 2015, 96 pages.

"3rd Generation Partnership Project; Technical Specification Group Radio Access Network; NR; Multiplexing and channel coding (Release 15)", 3GPP TS 38.212 V15.6 0, Jun. 2019, 101 pages.

"3rd Generation Partnership Project; Technical Specification Group Radio Access Network; NR; Physical layer procedures for data (Release 15)", 3GPP TS 38.214 V15.6.0, Jun. 2019, 105 pages.

Samsung, "CSI enhancement for MU-MIMO", 3GPP TSG RAN WG1 meeting #98, Aug. 26-30, 2019, R1-1908497, 17 pages.

Samsung, "Feature lead summary: agreements on MU-MIMO CSI until RAN1#97", 3GPP TSG RAN WG1 98, Aug. 26-30, 2019, R1-1908500, 6 pages.

LG Electronics, "Discussion on overhead reduction for Type II codebook", 3GPP TSG RAN WG1 #98, Aug. 26-30, 2019, R1-1908698, 15 pages.

Notification of Transmittal of the International Search Report and the Written Opinion of the International Searching Authority dated Dec. 3, 2020 in connection with International Patent Application No. PCT/KR2020/012171, 12 pages.

Extended European Search Report dated Oct. 18, 2022 regarding Application No. 20862371.0, 8 pages.

Samsung, "On UCI design for DFT-based compression", 3GPP TSG RAN WG1 meeting #96bis, R1-1904457, Apr. 2019, 5 pages.

Ericsson, "On CSI enhancements for MU-MIMO", 3GPP TSG RAN WG1 Meeting RAN1#98, R1-1909523, Aug. 2019, 28 pages.

* cited by examiner

METHOD AND APPARATUS FOR PORT SELECTION IN WIRELESS COMMUNICATION SYSTEMS

CROSS-REFERENCE TO RELATED APPLICATIONS AND CLAIM OF PRIORITY

This application is a continuation of U.S. patent application Ser. No. 17/011,914, filed on Sep. 3, 2020, which claims priority to U.S. Provisional Patent Application No. 62/897,905, filed on Sep. 9, 2019 and U.S. Provisional Patent Application No. 62/902,094, filed on Sep. 18, 2019. The content of the above-identified patent documents is incorporated herein by reference.

TECHNICAL FIELD

The present disclosure relates generally to wireless communication systems and more specifically to channel state information (CSI) parameter configuration in wireless communication systems.

BACKGROUND

Understanding and correctly estimating the channel between a user equipment (UE) and a base station (BS) (e.g., gNode B (gNB)) is important for efficient and effective wireless communication. In order to correctly estimate the DL channel conditions, the gNB may transmit a reference signal, e.g., CSI-RS, to the UE for DL channel measurement, and the UE may report (e.g., feedback) information about channel measurement, e.g., CSI, to the gNB. With this DL channel measurement, the gNB is able to select appropriate communication parameters to efficiently and effectively perform wireless data communication with the UE.

SUMMARY

Embodiments of the present disclosure provide methods and apparatuses to enable channel state information (CSI) reporting in a wireless communication system.

In one embodiment, a UE for CSI reporting in a wireless communication system is provided. The UE includes a transceiver configured to receive configuration information for a CSI report, where the configuration information includes information to: configure a codebook and parameters for the codebook, the codebook comprising a precoding matrix indicator (PMI) indicating a set of components S to represent $N_3$ precoding matrices, where $N_3 \geq 1$; and partition the PMI into two subsets, a first PMI subset indicating a first subset of components S1 from the set of components S, and a second PMI subset indicating a second subset of components S2 from the set of components S different from the first subset of components S1. The UE further includes a processor operably connected to the transceiver. The processor is configured to determine the CSI report based on the configuration information, the CSI report including the second PMI subset indicating the second subset of components S2. The transceiver is further configured to transmit the determined CSI report over an uplink (UL) channel.

In another embodiment, a BS in a wireless communication system is provided. The BS includes a processor configured to generate configuration information for a channel state information (CSI) report, where the configuration information includes information to: configure a codebook and parameters for the codebook, the codebook comprising a precoding matrix indicator (PMI) indicating a set of components S to represent $N_3$ precoding matrices, where $N_3 \geq 1$, and partition the PMI into two subsets, a first PMI subset indicating a first subset of components S1 from the set of components S, and a second PMI subset indicating a second subset of components S2 from the set of components S different from the first subset of components S1. The BS further includes a transceiver operably connected to the processor. The transceiver configured to: transmit the configuration information for the CSI report; and receive the CSI report over an uplink (UL) channel, the CSI report including the second PMI subset indicating the second subset of components S2.

In yet another embodiment, a method for operating a UE is provided. The method comprises: receiving configuration information for a CSI report, the configuration information includes information to: configure a codebook and parameters for the codebook, the codebook comprising a precoding matrix indicator (PMI) indicating a set of components S to represent $N_3$ precoding matrices, where $N_3 \geq 1$; and partition the PMI into two subsets, a first PMI subset indicating a first subset of components S1 from the set of components S, and a second PMI subset indicating a second subset of components S2 from the set of components S different from the first subset of components S1. The method further comprises determining the CSI report based on the configuration information, the CSI report including the second PMI subset indicating the second subset of components S2; and transmitting the determined CSI report over an uplink (UL) channel.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
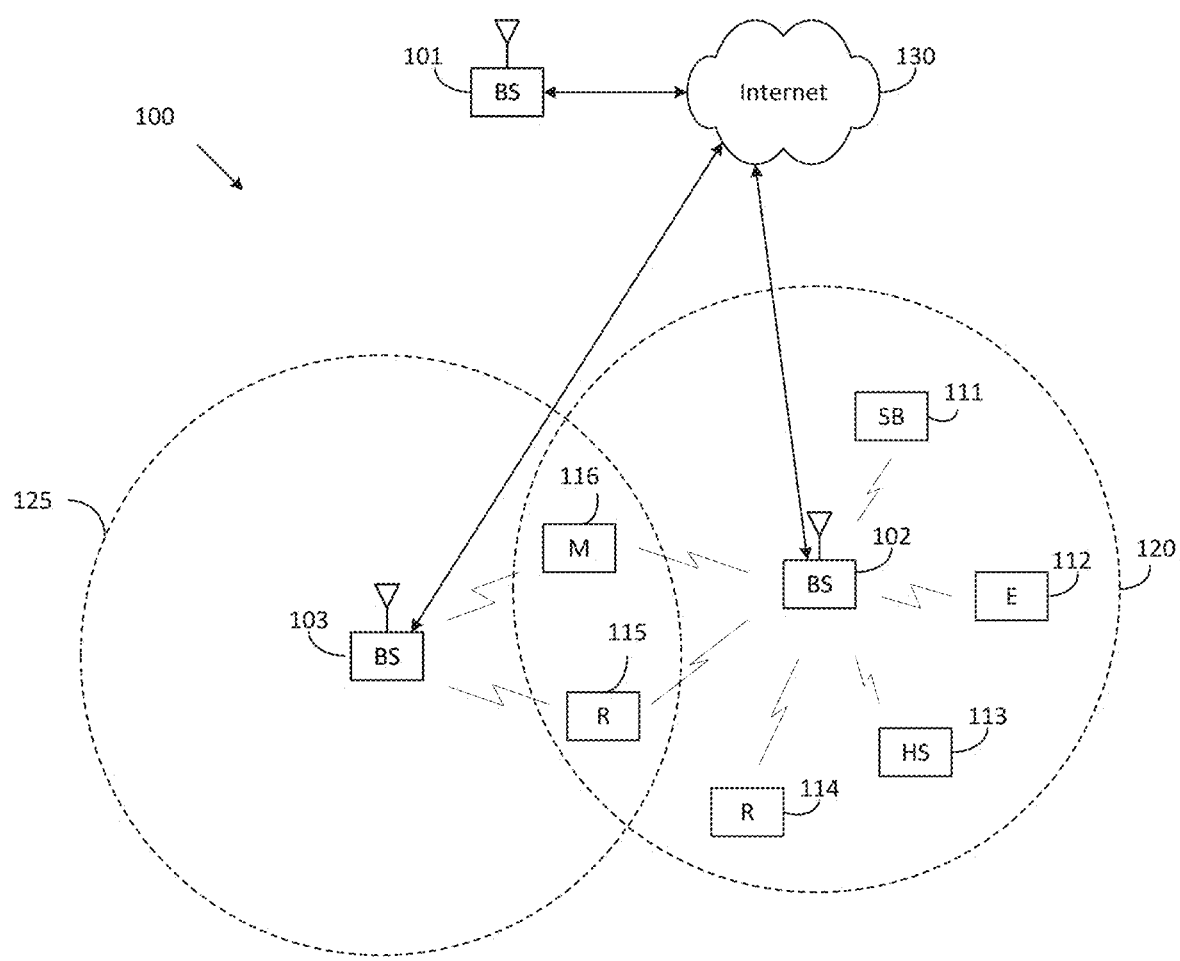
FIG. 1 illustrates an example wireless network according to embodiments of the present disclosure.

FIG. 1 through FIG. 15, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents and standards descriptions are hereby incorporated by reference into the present disclosure as if fully set forth herein: 3GPP TS 36.211 v16.2.0, "E-UTRA, Physical channels and modulation" (herein "REF 1"); 3GPP TS 36.212 v16.2.0, "E-UTRA, Multiplexing and Channel coding" (herein "REF 2"); 3GPP TS 36.213 v16.2.0, "E-UTRA, Physical Layer Procedures" (herein "REF 3"); 3GPP TS 36.321 v16.2.0, "E-UTRA, Medium Access Control (MAC) protocol specification" (herein "REF 4"); 3GPP TS 36.331 v16.2.0, "E-UTRA, Radio Resource Control (RRC) protocol specification" (herein "REF 5"); 3GPP TR 22.891 v14.2.0 (herein "REF 6"); 3GPP TS 38.212 v16.2.0, "E-UTRA, NR, Multiplexing and channel coding" (herein "REF 7"); 3GPP TS 38.214 v16.2.0, "E-UTRA, NR, Physical layer procedures for data" (herein "REF 8"); and 3GPP TS 38.213 v16.2.0, "E-UTRA, NR, Physical Layer Procedures for control" (herein "REF 9").

Aspects, features, and advantages of the disclosure are readily apparent from the following detailed description, simply by illustrating a number of particular embodiments and implementations, including the best mode contemplated for carrying out the disclosure. The disclosure is also capable of other and different embodiments, and its several details can be modified in various obvious respects, all without departing from the spirit and scope of the disclosure. Accordingly, the drawings and description are to be regarded as illustrative in nature, and not as restrictive. The disclosure is illustrated by way of example, and not by way of limitation, in the figures of the accompanying drawings.

In the following, for brevity, both FDD and TDD are considered as the duplex method for both DL and UL signaling.

Although exemplary descriptions and embodiments to follow assume orthogonal frequency division multiplexing (OFDM) or orthogonal frequency division multiple access (OFDMA), the present disclosure can be extended to other OFDM-based transmission waveforms or multiple access schemes such as filtered OFDM (F-OFDM).

To meet the demand for wireless data traffic having increased since deployment of 4G communication systems, efforts have been made to develop an improved 5G or pre-5G communication system. Therefore, the 5G or pre-5G communication system is also called a "beyond 4G network" or a "post LTE system."

The 5G communication system is considered to be implemented in higher frequency (mmWave) bands, e.g., 60 GHz bands, so as to accomplish higher data rates or in lower frequency bands, such as below 6 GHz, to enable robust coverage and mobility support. To decrease propagation loss of the radio waves and increase the transmission coverage, the beamforming, massive multiple-input multiple-output (MIMO), full dimensional MIMO (FD-MIMO), array antenna, an analog beam forming, large scale antenna techniques and the like are discussed in 5G communication systems.

In addition, in 5G communication systems, development for system network improvement is under way based on advanced small cells, cloud radio access networks (RANs), ultra-dense networks, device-to-device (D2D) communication, wireless backhaul communication, moving network, cooperative communication, coordinated multi-points (CoMP) transmission and reception, interference mitigation and cancellation and the like.

Figure 2:
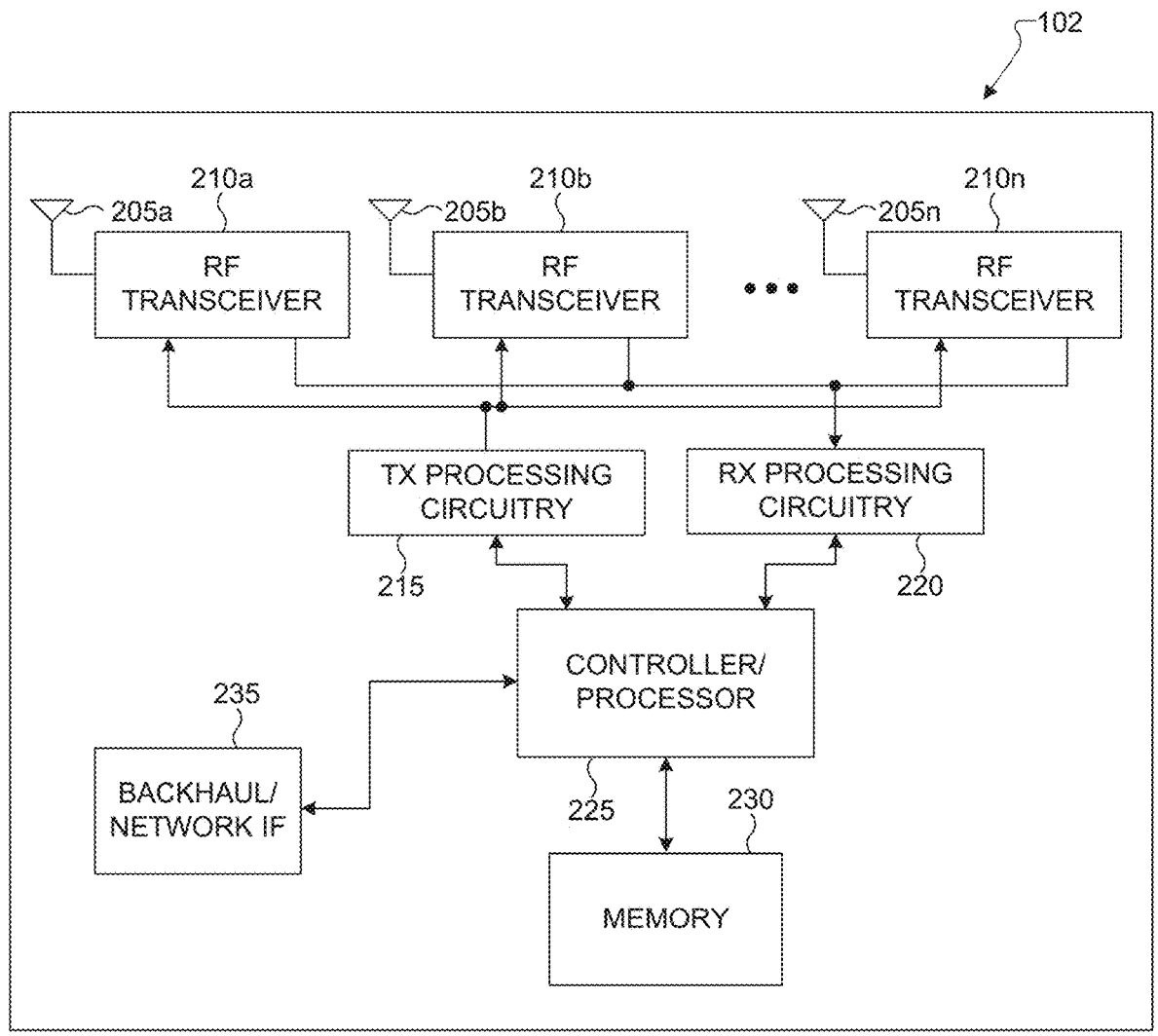
FIG. 2 illustrates an example gNB according to embodiments of the present disclosure.
Figure 3:
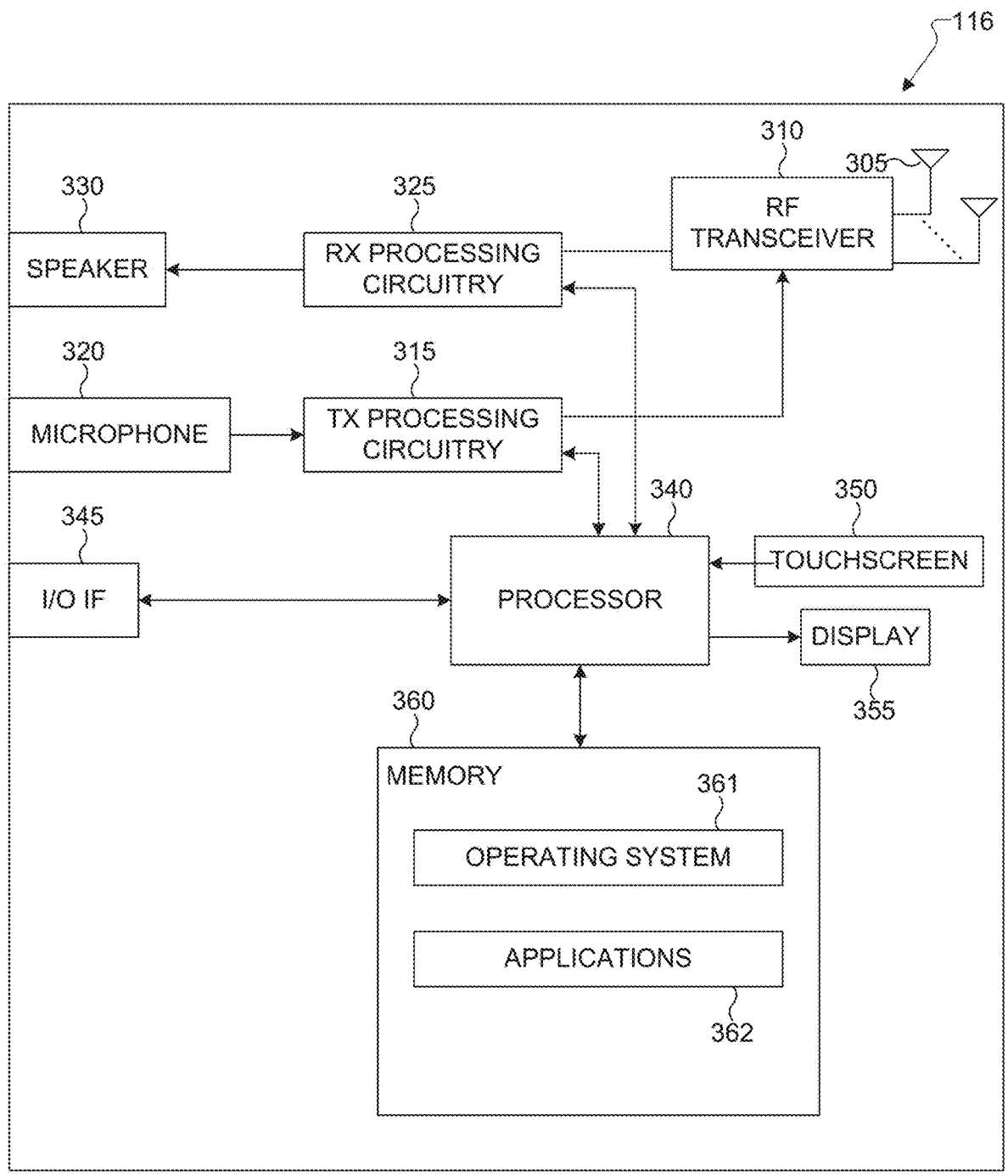
FIG. 3 illustrates an example UE according to embodiments of the present disclosure.

FIGS. 1-4B below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system. The present disclosure covers several components which can be used in conjunction or in combination with one another, or can operate as standalone schemes.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101, a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, for receiving configuration information for a CSI feedback, generating the CSI feedback, and transmitting the CSI feedback in a wireless communication system. In certain embodiments, one or more of the gNBs 101-103 includes circuitry, programing, or a combination thereof, for generating configuration information for a CSI feedback, transmitting the configuration information, and receiving the CSI feedback in a wireless communication system.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNB s 101 and 103 of FIG. 1 could have the same or similar configuration. However, gNB s come in a wide variety of configurations, and FIG. 2 does not limit the scope of this disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions.

For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for determining a CSI report based on received configuration information, where the configuration information includes information to: configure a codebook and parameters for the codebook, the codebook comprising a precoding matrix indicator (PMI) indicating a set of components S to represent $N_3$ precoding matrices, where $N_3 \geq 1$; and partition the PMI into two subsets, a first PMI subset indicating a first subset of components S1 from the set of components S, and a second PMI subset indicating a second subset of components S2 from the set of components S different from the first subset of components S1. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4A:
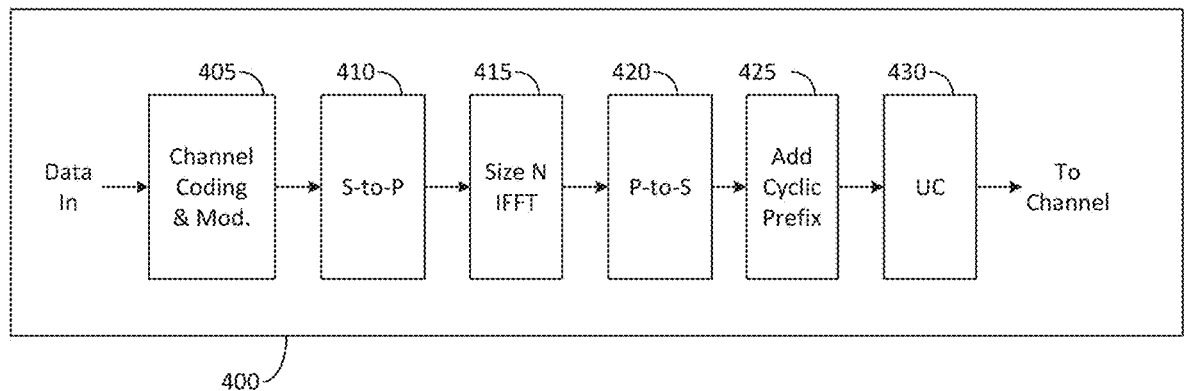
FIG. 4A illustrates a high-level diagram of an orthogonal frequency division multiple access transmit path according to embodiments of the present disclosure.
Figure 4B:
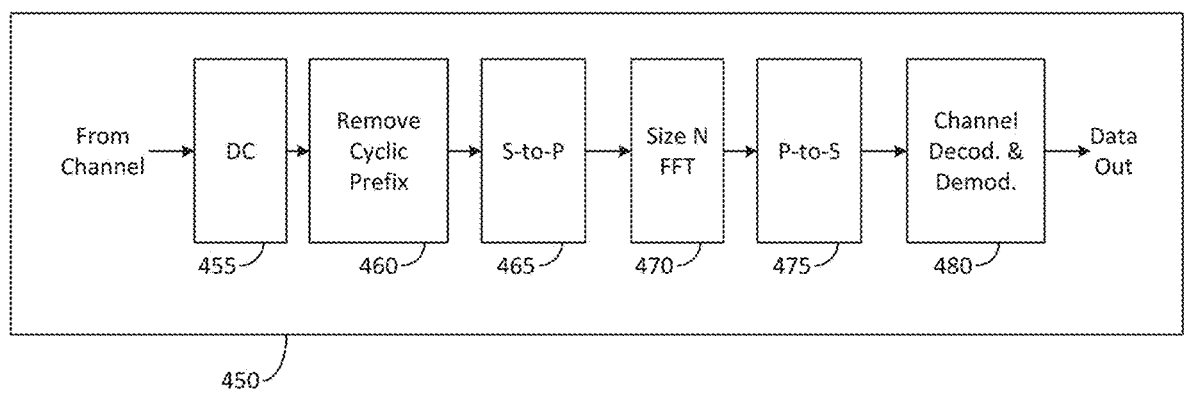
FIG. 4B illustrates a high-level diagram of an orthogonal frequency division multiple access receive path according to embodiments of the present disclosure.

FIG. 4A is a high-level diagram of transmit path circuitry. For example, the transmit path circuitry may be used for an orthogonal frequency division multiple access (OFDMA) communication. FIG. 4B is a high-level diagram of receive path circuitry. For example, the receive path circuitry may be used for an orthogonal frequency division multiple access (OFDMA) communication. In FIGS. 4A and 4B, for downlink communication, the transmit path circuitry may be implemented in a base station (gNB) 102 or a relay station, and the receive path circuitry may be implemented in a user equipment (e.g., user equipment 116 of FIG. 1). In other examples, for uplink communication, the receive path circuitry 450 may be implemented in a base station (e.g., gNB 102 of FIG. 1) or a relay station, and the transmit path circuitry may be implemented in a user equipment (e.g., user equipment 116 of FIG. 1).

Transmit path circuitry comprises channel coding and modulation block 405, serial-to-parallel (S-to-P) block 410, Size N Inverse Fast Fourier Transform (IFFT) block 415, parallel-to-serial (P-to-S) block 420, add cyclic prefix block 425, and up-converter (UC) 430. Receive path circuitry 450 comprises down-converter (DC) 455, remove cyclic prefix block 460, serial-to-parallel (S-to-P) block 465, Size N Fast Fourier Transform (FFT) block 470, parallel-to-serial (P-to-S) block 475, and channel decoding and demodulation block 480.

At least some of the components in FIGS. 4A 400 and 4B 450 may be implemented in software, while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and may not be construed to limit the scope of the disclosure. It may be appreciated that in an alternate embodiment of the present disclosure, the Fast Fourier Transform functions and the Inverse Fast Fourier Transform functions may easily be replaced by discrete Fourier transform (DFT) functions and inverse discrete Fourier transform (IDFT) functions, respectively. It may be appreciated that for DFT and IDFT functions, the value of the N variable may be any integer number (i.e., 1, 4, 3, 4, etc.), while for FFT and IFFT functions, the value of the N variable may be any integer number that is a power of two (i.e., 1, 2, 4, 8, 16, etc.).

In transmit path circuitry 400, channel coding and modulation block 405 receives a set of information bits, applies coding (e.g., LDPC coding) and modulates (e.g., quadrature phase shift keying (QPSK) or quadrature amplitude modulation (QAM)) the input bits to produce a sequence of frequency-domain modulation symbols. Serial-to-parallel block 410 converts (i.e., de-multiplexes) the serial modulated symbols to parallel data to produce N parallel symbol streams where N is the IFFT/FFT size used in BS 102 and UE 116. Size N IFFT block 415 then performs an IFFT operation on the N parallel symbol streams to produce time-domain output signals. Parallel-to-serial block 420 converts (i.e., multiplexes) the parallel time-domain output symbols from Size N IFFT block 415 to produce a serial time-domain signal. Add cyclic prefix block 425 then inserts a cyclic prefix to the time-domain signal. Finally, up-converter 430 modulates (i.e., up-converts) the output of add cyclic prefix block 425 to RF frequency for transmission via a wireless channel. The signal may also be filtered at baseband before conversion to RF frequency.

The transmitted RF signal arrives at the UE 116 after passing through the wireless channel, and reverse operations to those at gNB 102 are performed. Down-converter 455 down-converts the received signal to baseband frequency and removes cyclic prefix block 460, and removes the cyclic prefix to produce the serial time-domain baseband signal. Serial-to-parallel block 465 converts the time-domain baseband signal to parallel time-domain signals. Size N FFT block 470 then performs an FFT algorithm to produce N parallel frequency-domain signals. Parallel-to-serial block 475 converts the parallel frequency-domain signals to a sequence of modulated data symbols. Channel decoding and demodulation block 480 demodulates and then decodes the modulated symbols to recover the original input data stream.

Each of gNB s 101-103 may implement a transmit path that is analogous to transmitting in the downlink to user equipment 111-116 and may implement a receive path that is analogous to receiving in the uplink from user equipment 111-116. Similarly, each one of user equipment 111-116 may implement a transmit path corresponding to the architecture for transmitting in the uplink to gNB s 101-103 and may implement a receive path corresponding to the architecture for receiving in the downlink from gNBs 101-103.

5G communication system use cases have been identified and described. Those use cases can be roughly categorized into three different groups. In one example, enhanced mobile broadband (eMBB) is determined to do with high bits/sec requirement, with less stringent latency and reliability requirements. In another example, ultra reliable and low latency (URLL) is determined with less stringent bits/sec requirement. In yet another example, massive machine type communication (mMTC) is determined that a number of devices can be as many as 100,000 to 1 million per km2, but the reliability/throughput/latency requirement could be less stringent. This scenario may also involve power efficiency requirement as well, in that the battery consumption may be minimized as possible.

A communication system includes a downlink (DL) that conveys signals from transmission points such as base stations (BSs) or NodeBs to user equipments (UEs) and an Uplink (UL) that conveys signals from UEs to reception points such as NodeBs. A UE, also commonly referred to as a terminal or a mobile station, may be fixed or mobile and may be a cellular phone, a personal computer device, or an automated device. An eNodeB, which is generally a fixed station, may also be referred to as an access point or other equivalent terminology. For LTE systems, a NodeB is often referred as an eNodeB.

In a communication system, such as LTE system, DL signals can include data signals conveying information content, control signals conveying DL control information (DCI), and reference signals (RS) that are also known as pilot signals. An eNodeB transmits data information through a physical DL shared channel (PDSCH). An eNodeB transmits DCI through a physical DL control channel (PDCCH) or an Enhanced PDCCH (EPDCCH).

An eNodeB transmits acknowledgement information in response to data transport block (TB) transmission from a UE in a physical hybrid ARQ indicator channel (PHICH). An eNodeB transmits one or more of multiple types of RS including a UE-common RS (CRS), a channel state information RS (CSI-RS), or a demodulation RS (DMRS). A CRS is transmitted over a DL system bandwidth (BW) and can be used by UEs to obtain a channel estimate to demodulate data or control information or to perform measurements. To reduce CRS overhead, an eNodeB may transmit a CSI-RS with a smaller density in the time and/or frequency domain than a CRS. DMRS can be transmitted only in the BW of a respective PDSCH or EPDCCH and a UE can use the DMRS to demodulate data or control information in a PDSCH or an EPDCCH, respectively. A transmission time interval for DL channels is referred to as a subframe and can have, for example, duration of 1 millisecond.

DL signals also include transmission of a logical channel that carries system control information. A BCCH is mapped to either a transport channel referred to as a broadcast channel (BCH) when the DL signals convey a master information block (MIB) or to a DL shared channel (DL-SCH) when the DL signals convey a System Information Block (SIB). Most system information is included in different SIB s that are transmitted using DL-SCH. A presence of system information on a DL-SCH in a subframe can be indicated by a transmission of a corresponding PDCCH conveying a codeword with a cyclic redundancy check (CRC) scrambled with system information RNTI (SI-RNTI). Alternatively, scheduling information for a SIB transmission can be provided in an earlier SIB and scheduling information for the first SIB (SIB-1) can be provided by the MIB.

DL resource allocation is performed in a unit of subframe and a group of physical resource blocks (PRBs). A transmission BW includes frequency resource units referred to as resource blocks (RBs). Each RB includes $N_{sc}^{RB}$ sub-carriers, or resource elements (REs), such as 12 REs. A unit of one RB over one subframe is referred to as a PRB. A UE can be allocated $M_{PDSCH}$ RBs for a total of $M_{sc}^{PDSCH} = M_{PDSCH} \cdot N_{sc}^{RB}$ REs for the PDSCH transmission BW.

UL signals can include data signals conveying data information, control signals conveying UL control information (UCI), and UL RS. UL RS includes DMRS and Sounding RS (SRS). A UE transmits DMRS only in a BW of a respective PUSCH or PUCCH. An eNodeB can use a DMRS to demodulate data signals or UCI signals. A UE transmits SRS to provide an eNodeB with an UL CSI. A UE transmits data information or UCI through a respective physical UL shared channel (PUSCH) or a Physical UL control channel (PUCCH). If a UE needs to transmit data information and UCI in a same UL subframe, the UE may multiplex both in a PUSCH. UCI includes Hybrid Automatic Repeat request acknowledgement (HARQ-ACK) information, indicating correct (ACK) or incorrect (NACK) detection for a data TB in a PDSCH or absence of a PDCCH detection (DTX), scheduling request (SR) indicating whether a UE has data in the UE's buffer, rank indicator (RI), and channel state information (CSI) enabling an eNodeB to perform link adaptation for PDSCH transmissions to a UE. HARQ-ACK information is also transmitted by a UE in response to a detection of a PDCCH/EPDCCH indicating a release of semi-persistently scheduled PDSCH.

An UL subframe includes two slots. Each slot includes $N_{symb}^{UL}$ symbols for transmitting data information, UCI, DMRS, or SRS. A frequency resource unit of an UL system BW is a RB. A UE is allocated $N_{RB}$ RBs for a total of $N_{RB} \cdot N_{sc}^{RB}$ REs for a transmission BW. For a PUCCH, $N_{RB}=1$. A last subframe symbol can be used to multiplex SRS transmissions from one or more UEs. A number of subframe symbols that are available for data/UCI/DMRS transmission is $N_{symb}=2 \cdot (N_{symb}^{UL}-1)-N_{SRS}$, where $N_{SRS}=1$ if a last subframe symbol is used to transmit SRS and $N_{SRS}=0$ otherwise.

Figure 5:
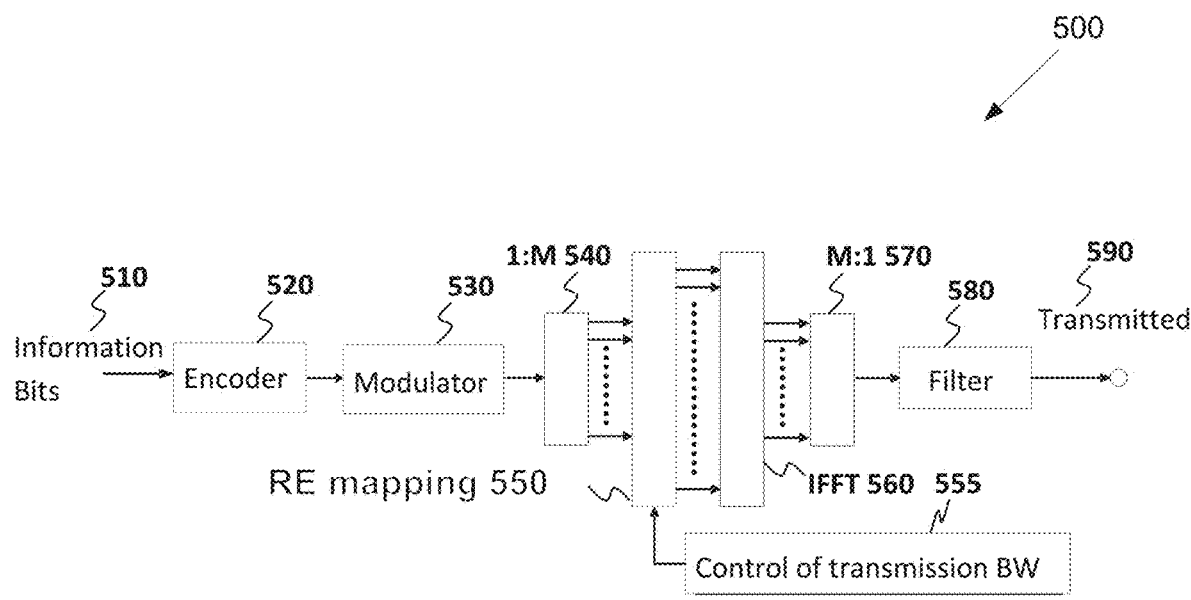
FIG. 5 illustrates a transmitter block diagram for a PDSCH in a subframe according to embodiments of the present disclosure.

FIG. 5 illustrates a transmitter block diagram 500 for a PDSCH in a subframe according to embodiments of the present disclosure. The embodiment of the transmitter block diagram 500 illustrated in FIG. 5 is for illustration only. One or more of the components illustrated in FIG. 5 can be implemented in specialized circuitry configured to perform the noted functions or one or more of the components can be implemented by one or more processors executing instructions to perform the noted functions. FIG. 5 does not limit the scope of this disclosure to any particular implementation of the transmitter block diagram 500.

As shown in FIG. 5, information bits 510 are encoded by encoder 520, such as a turbo encoder, and modulated by modulator 530, for example using quadrature phase shift keying (QPSK) modulation. A serial to parallel (S/P) converter 540 generates M modulation symbols that are subsequently provided to a mapper 550 to be mapped to REs selected by a transmission BW selection unit 555 for an assigned PDSCH transmission BW, unit 560 applies an Inverse fast Fourier transform (IFFT), the output is then serialized by a parallel to serial (P/S) converter 570 to create a time domain signal, filtering is applied by filter 580, and a signal transmitted 590. Additional functionalities, such as data scrambling, cyclic prefix insertion, time windowing, interleaving, and others are well known in the art and are not shown for brevity.

Figure 6:
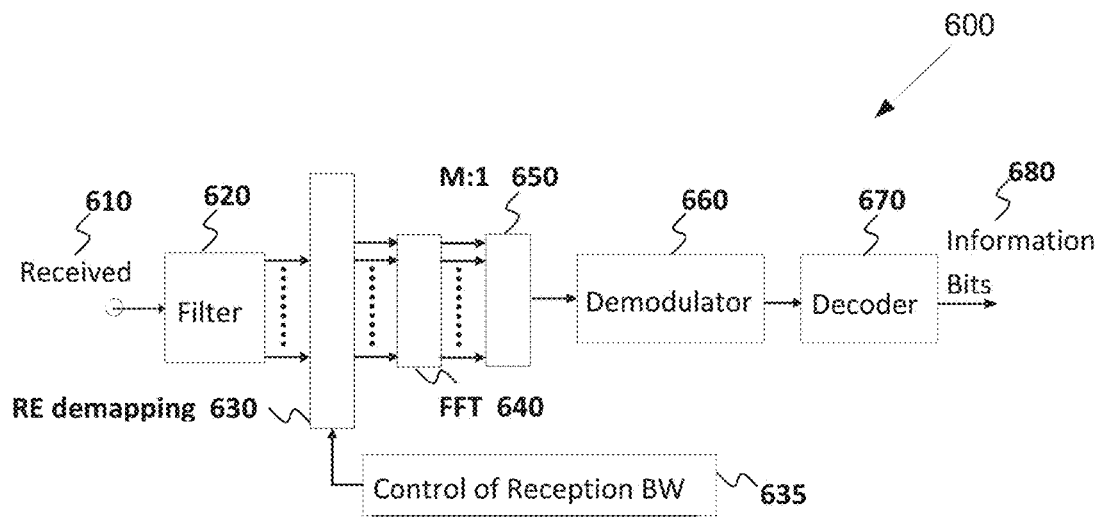
FIG. 6 illustrates a receiver block diagram for a PDSCH in a subframe according to embodiments of the present disclosure.

FIG. 6 illustrates a receiver block diagram 600 for a PDSCH in a subframe according to embodiments of the present disclosure. The embodiment of the diagram 600 illustrated in FIG. 6 is for illustration only. One or more of the components illustrated in FIG. 6 can be implemented in specialized circuitry configured to perform the noted functions or one or more of the components can be implemented by one or more processors executing instructions to perform the noted functions. FIG. 6 does not limit the scope of this disclosure to any particular implementation of the diagram 600.

As shown in FIG. 6, a received signal 610 is filtered by filter 620, REs 630 for an assigned reception BW are selected by BW selector 635, unit 640 applies a fast Fourier transform (FFT), and an output is serialized by a parallel-to-serial converter 650. Subsequently, a demodulator 660 coherently demodulates data symbols by applying a channel estimate obtained from a DMRS or a CRS (not shown), and a decoder 670, such as a turbo decoder, decodes the demodulated data to provide an estimate of the information data bits 680. Additional functionalities such as time-windowing, cyclic prefix removal, de-scrambling, channel estimation, and de-interleaving are not shown for brevity.

Figure 7:
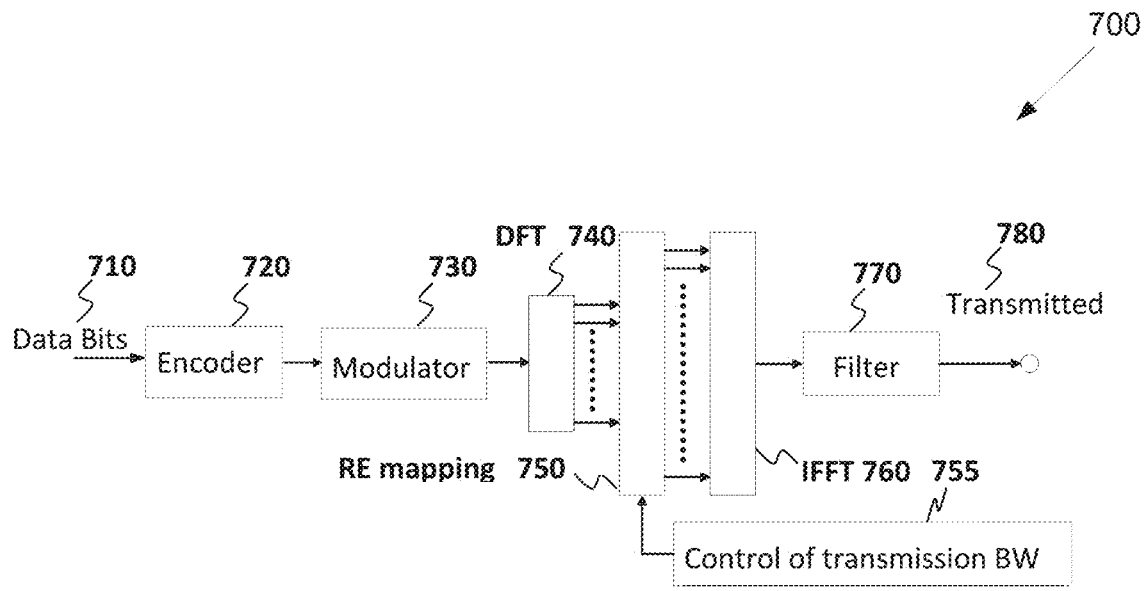
FIG. 7 illustrates a transmitter block diagram for a PUSCH in a subframe according to embodiments of the present disclosure.

FIG. 7 illustrates a transmitter block diagram 700 for a PUSCH in a subframe according to embodiments of the present disclosure. The embodiment of the block diagram 700 illustrated in FIG. 7 is for illustration only. One or more of the components illustrated in FIG. 5 can be implemented in specialized circuitry configured to perform the noted functions or one or more of the components can be implemented by one or more processors executing instructions to perform the noted functions. FIG. 7 does not limit the scope of this disclosure to any particular implementation of the block diagram 700.

As shown in FIG. 7, information data bits 710 are encoded by encoder 720, such as a turbo encoder, and modulated by modulator 730. A discrete Fourier transform (DFT) unit 740 applies a DFT on the modulated data bits, REs 750 corresponding to an assigned PUSCH transmission BW are selected by transmission BW selection unit 755, unit 760 applies an IFFT and, after a cyclic prefix insertion (not shown), filtering is applied by filter 770 and a signal transmitted 780.

Figure 8:
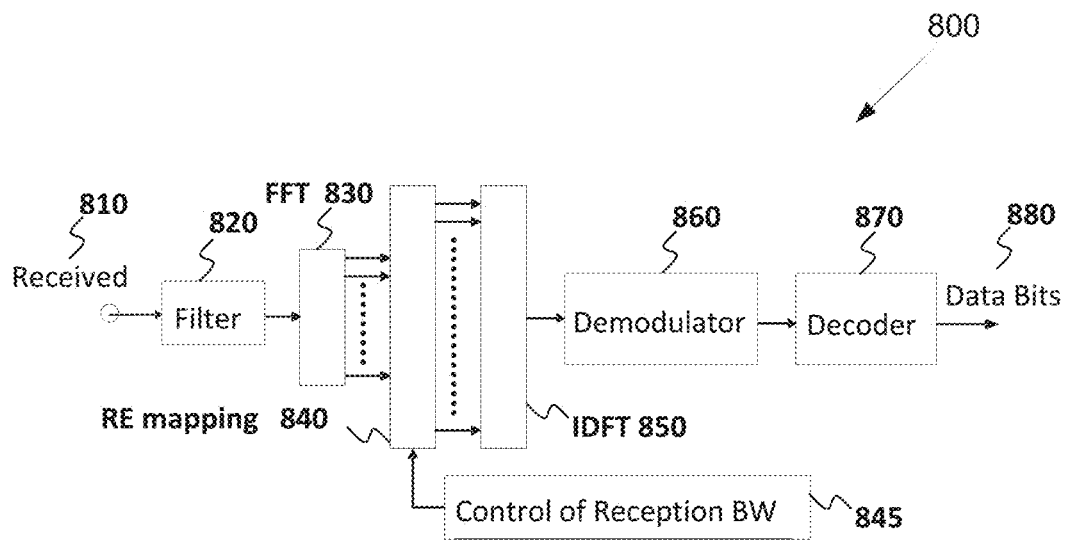
FIG. 8 illustrates a receiver block diagram for a PUSCH in a subframe according to embodiments of the present disclosure.

FIG. 8 illustrates a receiver block diagram 800 for a PUSCH in a subframe according to embodiments of the present disclosure. The embodiment of the block diagram 800 illustrated in FIG. 8 is for illustration only. One or more of the components illustrated in FIG. 8 can be implemented in specialized circuitry configured to perform the noted functions or one or more of the components can be implemented by one or more processors executing instructions to perform the noted functions. FIG. 8 does not limit the scope of this disclosure to any particular implementation of the block diagram 800.

As shown in FIG. 8, a received signal 810 is filtered by filter 820. Subsequently, after a cyclic prefix is removed (not shown), unit 830 applies a FFT, REs 840 corresponding to an assigned PUSCH reception BW are selected by a reception BW selector 845, unit 850 applies an inverse DFT (IDFT), a demodulator 860 coherently demodulates data symbols by applying a channel estimate obtained from a DMRS (not shown), a decoder 870, such as a turbo decoder, decodes the demodulated data to provide an estimate of the information data bits 880.

In next generation cellular systems, various use cases are envisioned beyond the capabilities of LTE system. Termed 5G or the fifth generation cellular system, a system capable of operating at sub-6 GHz and above-6 GHz (for example, in mmWave regime) becomes one of the requirements. In 3GPP TR 22.891, 74 5G use cases have been identified and described; those use cases can be roughly categorized into three different groups. A first group is termed "enhanced mobile broadband (eMBB)," targeted to high data rate services with less stringent latency and reliability requirements. A second group is termed "ultra-reliable and low latency (URLL)" targeted for applications with less stringent data rate requirements, but less tolerant to latency. A third group is termed "massive MTC (mMTC)" targeted for large number of low-power device connections such as 1 million per $km^2$ with less stringent the reliability, data rate, and latency requirements.

Figure 9:
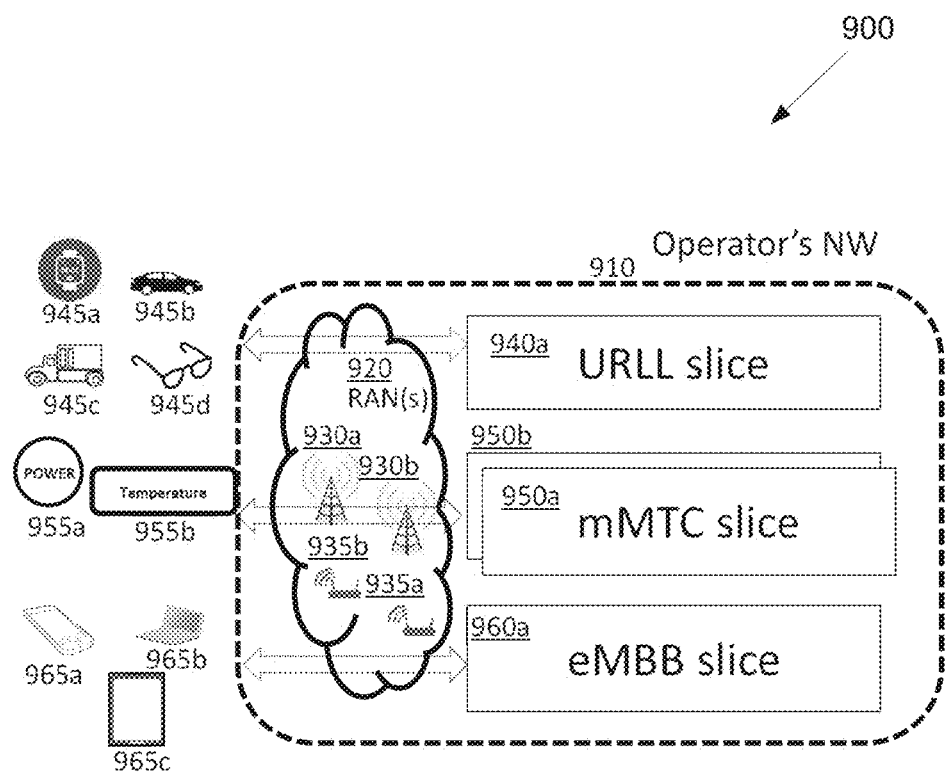
FIG. 9 illustrates an example network configuration according to embodiments of the present disclosure.

FIG. 9 illustrates an example network configuration 900 according to embodiments of the present disclosure. The embodiment of the network configuration 900 illustrated in FIG. 9 is for illustration only. FIG. 9 does not limit the scope of this disclosure to any particular implementation of the configuration 900.

In order for the 5G network to support such diverse services with different quality of services (QoS), one scheme has been identified in 3GPP specification, called network slicing.

As shown in FIG. 9, an operator's network 910 includes a number of radio access network(s) 920 (RAN(s)) that are associated with network devices such as gNBs 930*a* and 930*b*, small cell base stations (femto/pico gNBs or Wi-Fi access points) 935*a* and 935*b*. The network 910 can support various services, each represented as a slice.

In the example, an URLL slice 940*a* serves UEs requiring URLL services such as cars 945*b*, trucks 945*c*, smart watches 945*a*, and smart glasses 945*d*. Two mMTC slices 950*a* and 950*b* serve UEs requiring mMTC services such as power meters 955*a*, and temperature control box 955*b*. One eMBB slice 960*a* serves UEs requiring eMBB services such as cells phones 965*a*, laptops 965*b*, and tablets 965*c*. A device configured with two slices can also be envisioned.

To utilize PHY resources efficiently and multiplex various slices (with different resource allocation schemes, numerologies, and scheduling strategies) in DL-SCH, a flexible and self-contained frame or subframe design is utilized.

Figure 10:
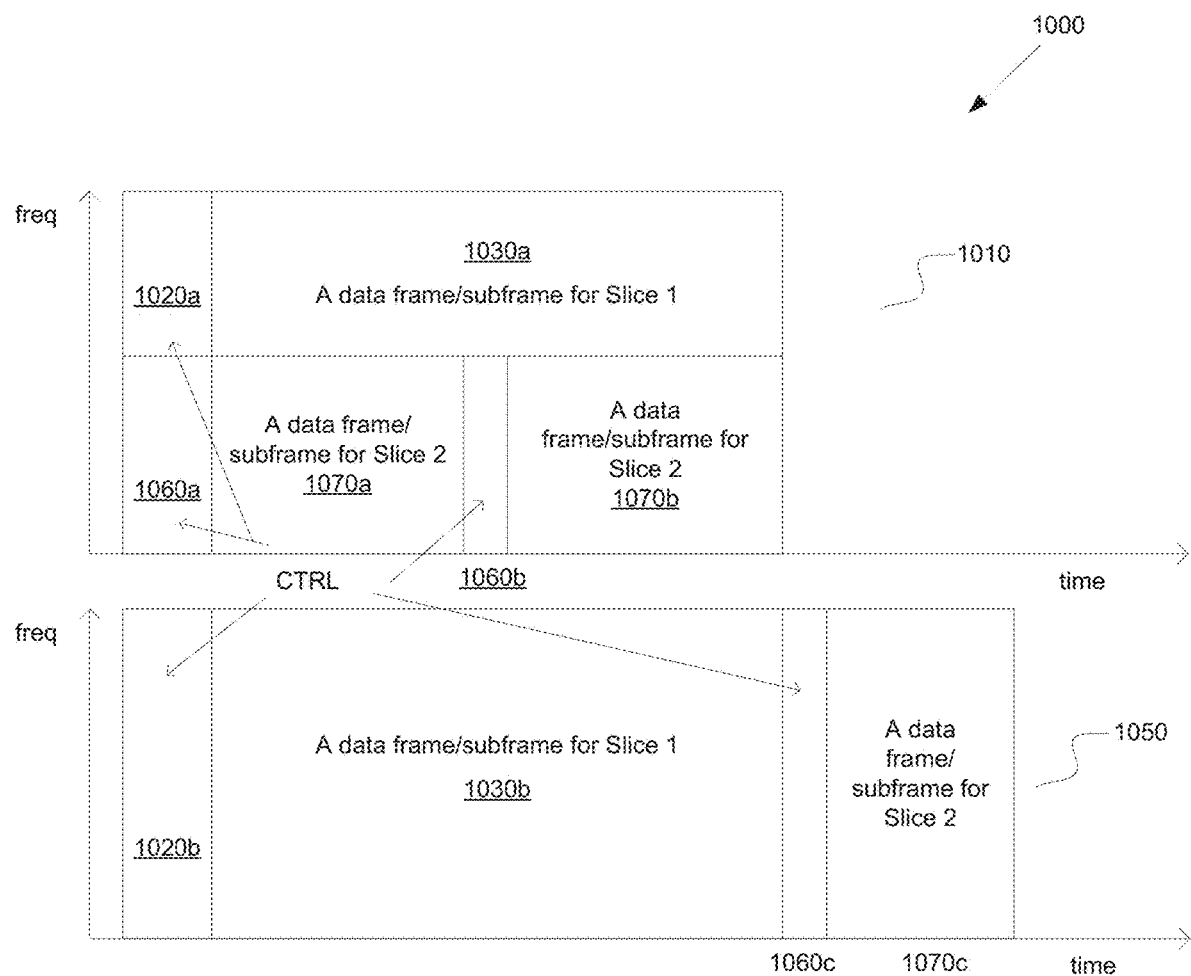
FIG. 10 illustrates an example multiplexing of two slices according to embodiments of the present disclosure.

FIG. 10 illustrates an example multiplexing of two slices 1000 according to embodiments of the present disclosure. The embodiment of the multiplexing of two slices 1000 illustrated in FIG. 10 is for illustration only. One or more of the components illustrated in FIG. 10 can be implemented in specialized circuitry configured to perform the noted functions or one or more of the components can be implemented by one or more processors executing instructions to perform the noted functions. FIG. 10 does not limit the scope of this disclosure to any particular implementation of the multiplexing of two slices 1000.

Two exemplary instances of multiplexing two slices within a common subframe or frame are depicted in FIG. 10. In these exemplary embodiments, a slice can be composed of one or two transmission instances where one transmission instance includes a control (CTRL) component (e.g., 1020*a*, 1060*a*, 1060*b*, 1020*b*, or 1060*c*) and a data component (e.g., 1030*a*, 1070*a*, 1070*b*, 1030*b*, or 1070*c*). In embodiment 1010, the two slices are multiplexed in frequency domain whereas in embodiment 1050, the two slices are multiplexed in time domain.

The 3GPP NR specification supports up to 32 CSI-RS antenna ports which enable a gNB to be equipped with a large number of antenna elements (such as 64 or 128). In this case, a plurality of antenna elements is mapped onto one CSI-RS port. For next generation cellular systems such as 5G, the maximum number of CSI-RS ports can either remain the same or increase.

Figure 11:
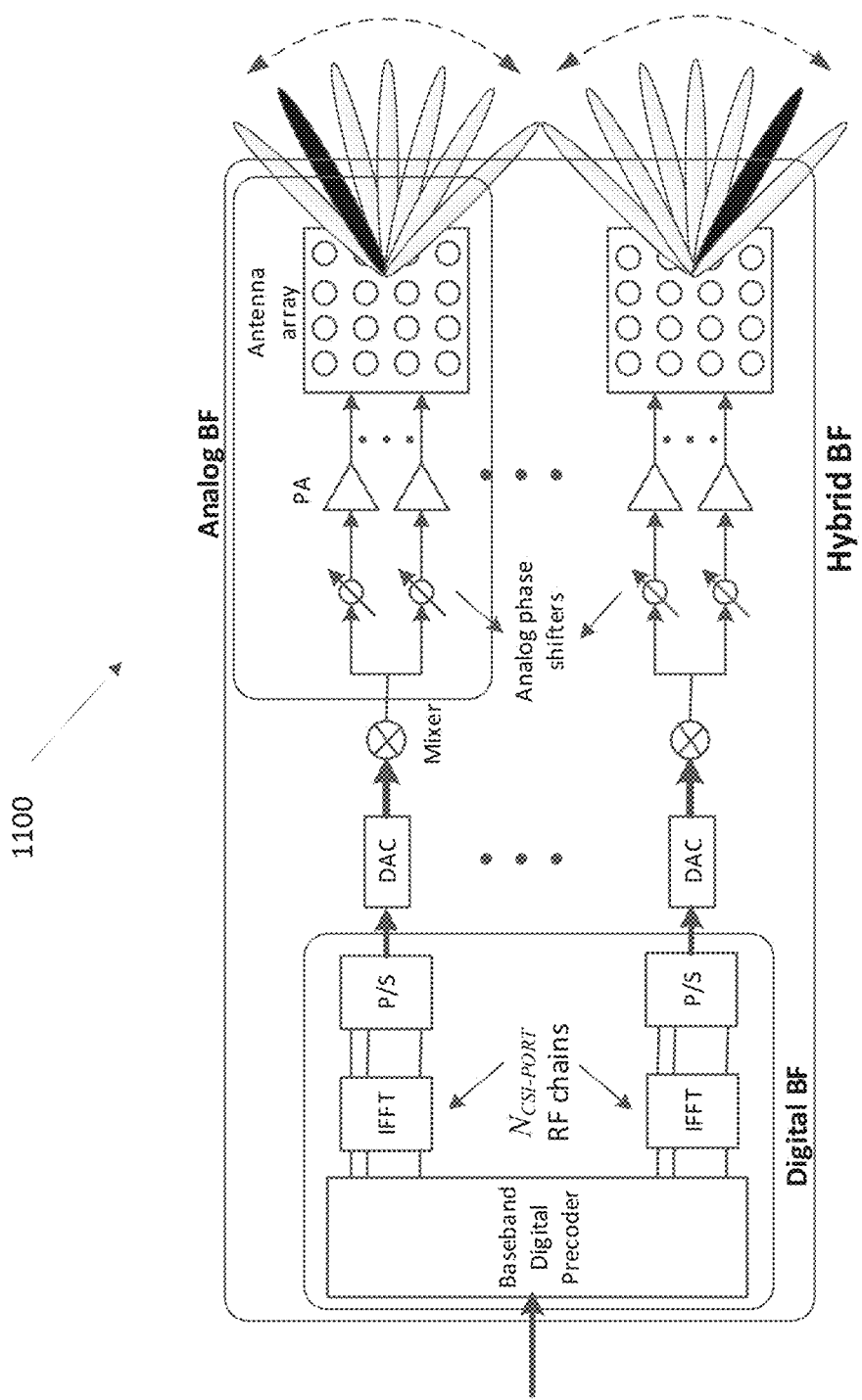
FIG. 11 illustrates an example antenna blocks according to embodiments of the present disclosure.

FIG. 11 illustrates an example antenna blocks 1100 according to embodiments of the present disclosure. The embodiment of the antenna blocks 1100 illustrated in FIG. 11 is for illustration only. FIG. 11 does not limit the scope of this disclosure to any particular implementation of the antenna blocks 1100.

For mmWave bands, although the number of antenna elements can be larger for a given form factor, the number of CSI-RS ports—which can correspond to the number of digitally precoded ports—tends to be limited due to hardware constraints (such as the feasibility to install a large number of ADCs/DACs at mmWave frequencies) as illustrated in FIG. 11. In this case, one CSI-RS port is mapped onto a large number of antenna elements which can be controlled by a bank of analog phase shifters. One CSI-RS port can then correspond to one sub-array which produces a narrow analog beam through analog beamforming. This analog beam can be configured to sweep across a wider range of angles by varying the phase shifter bank across symbols or subframes. The number of sub-arrays (equal to the number of RF chains) is the same as the number of CSI-RS ports $N_{CSI\text{-}PORT}$. A digital beamforming unit performs a linear combination across $N_{CSI\text{-}PORT}$ analog beams to further increase precoding gain. While analog beams are wideband (hence not frequency-selective), digital precoding can be varied across frequency sub-bands or resource blocks.

To enable digital precoding, efficient design of CSI-RS is a crucial factor. For this reason, three types of CSI reporting mechanism corresponding to three types of CSI-RS measurement behavior are supported, for example, "CLASS A" CSI reporting which corresponds to non-precoded CSI-RS, "CLASS B" reporting with K=1 CSI-RS resource which corresponds to UE-specific beamformed CSI-RS, and "CLASS B" reporting with K>1 CSI-RS resources which corresponds to cell-specific beamformed CSI-RS.

For non-precoded (NP) CSI-RS, a cell-specific one-to-one mapping between CSI-RS port and TXRU is utilized. Different CSI-RS ports have the same wide beam width and direction and hence generally cell wide coverage. For beamformed CSI-RS, beamforming operation, either cell-specific or UE-specific, is applied on a non-zero-power (NZP) CSI-RS resource (e.g., comprising multiple ports). At least at a given time/frequency, CSI-RS ports have narrow beam widths and hence not cell wide coverage, and at least from the gNB perspective. At least some CSI-RS port-resource combinations have different beam directions.

In scenarios where DL long-term channel statistics can be measured through UL signals at a serving eNodeB, UE-specific BF CSI-RS can be readily used. This is typically feasible when UL-DL duplex distance is sufficiently small. When this condition does not hold, however, some UE feedback is necessary for the eNodeB to obtain an estimate of DL long-term channel statistics (or any of representation thereof). To facilitate such a procedure, a first BF CSI-RS transmitted with periodicity T1 (ms) and a second NP CSI-RS transmitted with periodicity T2 (ms), where T1 T2. This approach is termed hybrid CSI-RS. The implementation of hybrid CSI-RS is largely dependent on the definition of CSI process and NZP CSI-RS resource.

In the 3GPP LTE specification, MIMO has been identified as an essential feature in order to achieve high system throughput requirements and it will continue to be the same in NR. One of the key components of a MIMO transmission scheme is the accurate CSI acquisition at the eNB (or TRP). For MU-MIMO, in particular, the availability of accurate CSI is necessary in order to guarantee high MU performance. For TDD systems, the CSI can be acquired using the SRS transmission relying on the channel reciprocity. For FDD systems, on the other hand, the CSI can be acquired using the CSI-RS transmission from the eNB, and CSI acquisition and feedback from the UE. In legacy FDD systems, the CSI feedback framework is 'implicit' in the form of CQI/PMI/RI derived from a codebook assuming SU transmission from the eNB. Because of the inherent SU assumption while deriving CSI, this implicit CSI feedback is inadequate for MU transmission. Since future (e.g., NR) systems are likely to be more MU-centric, this SU-MU CSI mismatch will be a bottleneck in achieving high MU performance gains. Another issue with implicit feedback is the scalability with larger number of antenna ports at the eNB. For large number of antenna ports, the codebook design for implicit feedback is quite complicated, and the designed codebook is not guaranteed to bring justifiable performance benefits in practical deployment scenarios (for example, only a small percentage gain can be shown at the most).

In 5G or NR systems, the above-mentioned CSI reporting paradigm from LTE is also supported and referred to as Type I CSI reporting. In addition to Type I, a high-resolution CSI reporting, referred to as Type II CSI reporting, is also supported to provide more accurate CSI information to gNB for use cases such as high-order MU-MIMO.

Figure 12:
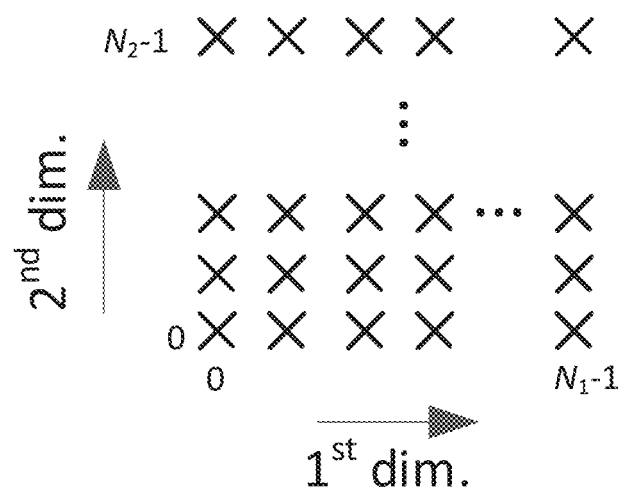
FIG. 12 illustrates an antenna port layout according to embodiments of the present disclosure.

FIG. 12 illustrates an example antenna port layout 1200 according to embodiments of the present disclosure. The embodiment of the antenna port layout 1200 illustrated in FIG. 12 is for illustration only. FIG. 12 does not limit the scope of this disclosure to any particular implementation of the antenna port layout 1200.

As illustrated in FIG. 12, $N_1$ and $N_2$ are the number of antenna ports with the same polarization in the first and second dimensions, respectively. For 2D antenna port layouts, $N_1>1$, $N_2>1$, and for 1D antenna port layouts $N_1>1$ and $N_2=1$. Therefore, for a dual-polarized antenna port layout, the total number of antenna ports is $2N_1N_2$.

As described in U.S. Pat. No. 10,659,118, issued May 19, 2020 and entitled "Method and Apparatus for Explicit CSI Reporting in Advanced Wireless Communication Systems," which is incorporated herein by reference in its entirety, a UE is configured with high-resolution (e.g., Type II) CSI reporting in which the linear combination based Type II CSI reporting framework is extended to include a frequency dimension in addition to the first and second antenna port dimensions.

Figure 13:
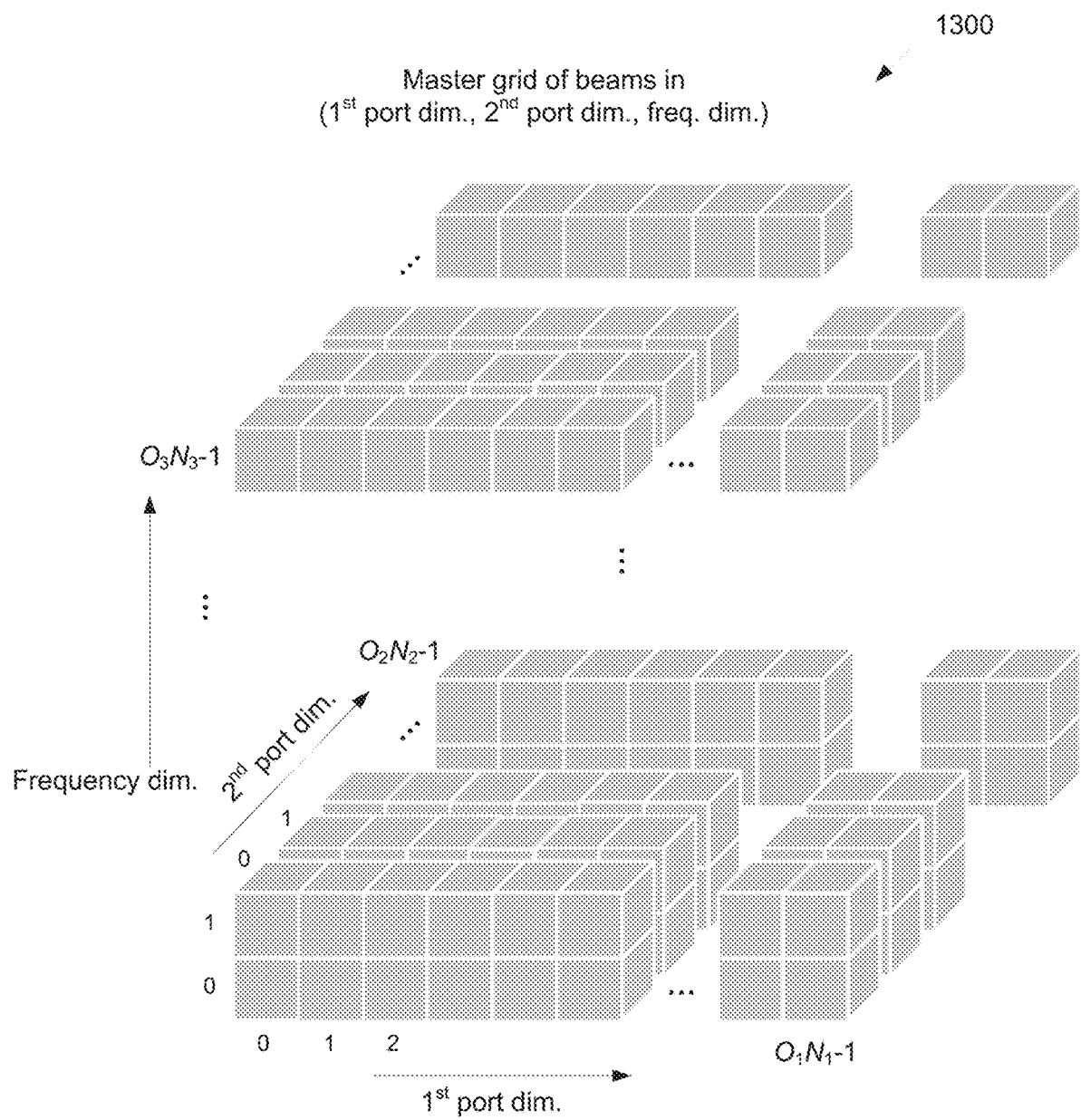
FIG. 13 illustrates a 3D grid of oversampled DFT beams according to embodiments of the present disclosure.

FIG. 13 illustrates a 3D grid 1300 of the oversampled DFT beams (1st port dim., 2nd port dim., freq. dim.) in which 1st dimension is associated with the 1st port dimension, 2nd dimension is associated with the 2nd port dimension, and 3rd dimension is associated with the frequency dimension.

The basis sets for $1^{st}$ and $2^{nd}$ port domain representation are oversampled DFT codebooks of length-$N_1$ and length-$N_2$, respectively, and with oversampling factors $O_1$ and $O_2$, respectively. Likewise, the basis set for frequency domain representation (i.e., 3rd dimension) is an oversampled DFT codebook of length-$N_3$ and with oversampling factor $O_3$. In one example, $O_1=O_2=O_3=4$. In another example, the oversampling factors $O_i$ belongs to $\{2, 4, 8\}$. In yet another example, at least one of $O_1$, $O_2$, and $O_3$ is higher layer configured (via RRC signaling).

A UE is configured with higher layer parameter CodebookType set to 'TypeII-Compression' or 'TypeIII' for an enhanced Type II CSI reporting in which the pre-coders for all subbands (SBs) and for a given layer l=1, . . . , v, where v is the associated RI value, is given by either $$W^l = AC_l B^H = [a_0 \ a_1 \ \ldots \ a_{L-1}] \begin{bmatrix} c_{l,0,0} & c_{l,0,1} & \cdots & c_{l,0,M-1} \\ c_{l,1,0} & c_{l,1,1} & \cdots & c_{l,1,M-1} \\ \vdots & \vdots & \vdots & \vdots \\ c_{l,L-1,0} & c_{l,L-1,1} & \cdots & c_{l,L-1,M-1} \end{bmatrix} [b_0 \ b_1 \ \ldots \ b_{M-1}]^H = \sum_{m=0}^{M-1}\sum_{i=0}^{L-1} c_{l,i,m}(a_i b_m^H) = \sum_{i=0}^{L-1}\sum_{m=0}^{M-1} c_{l,i,m}(a_i b_m^H),$$ (Eq. 1)

or $$W^l = \begin{bmatrix} A & 0 \\ 0 & A \end{bmatrix} C_l B^H = \begin{bmatrix} a_0 \ a_1 \ \ldots \ a_{L-1} & 0 \\ 0 & a_0 \ a_1 \ \ldots \ a_{L-1} \end{bmatrix} \begin{bmatrix} c_{l,0,0} & c_{l,0,1} & \cdots & c_{l,0,M-1} \\ c_{l,1,0} & c_{l,1,1} & \cdots & c_{l,1,M-1} \\ \vdots & \vdots & \vdots & \vdots \\ c_{l,L-1,0} & c_{l,L-1,1} & \cdots & c_{l,L-1,M-1} \end{bmatrix} [b_0 \ b_1 \ \ldots \ b_{M-1}]^H = \begin{bmatrix} \sum_{m=0}^{M-1}\sum_{i=0}^{L-1} c_{l,i,m}(a_i b_m^H) \\ \sum_{m=0}^{M-1}\sum_{i=0}^{L-1} c_{l,i,m}(a_i b_m^H) \end{bmatrix},$$ (Eq. 2)

where
- $N_1$ is a number of antenna ports in a first antenna port dimension,
- $N_2$ is a number of antenna ports in a second antenna port dimension,
- $N_3$ is a number of SBs or frequency domain (FD) units/components for PMI reporting (that comprise the CSI reporting band), which can be different (e.g., less than) from a number of SBs for CQI reporting,
- $a_i$ is a $2N_1N_2\times 1$ (Eq. 1) or $N_1N_2\times 1$ (Eq. 2) column vector,
- $b_m$ is a $N_3\times 1$ column vector,
- $c_{l,i,m}$ is a complex coefficient.

In a variation, when a subset $K<2LM$ coefficients (where K is either fixed, configured by the gNB or reported by the UE), then the coefficient $c_{l,i,m}$ in precoder equations Eq. 1 or Eq. 2 is replaced with $v_{l,i,m} \times c_{l,i,m}$, where
- $v_{l,i,m}=1$ if the coefficient $c_{l,i,m}$ is non-zero, hence reported by the UE according to some embodiments of this disclosure.
- $v_{l,i,m}=0$ otherwise (i.e., $c_{l,i,m}$ is zero, hence not reported by the UE).

The indication whether $v_{l,i,m}=1$ or 0 is according to some embodiments of this disclosure.

In a variation, the precoder equations Eq. 1 or Eq. 2 are respectively generalized to $$W^l = \sum_{i=0}^{L-1}\sum_{m=0}^{M_i-1} c_{l,i,m}(a_i b_{i,m}^H)$$ (Eq. 3)

and $$W^l = \begin{bmatrix} \sum_{i=0}^{L-1}\sum_{m=0}^{M_i-1} c_{l,i,m}(a_i b_{i,m}^H) \\ \sum_{i=0}^{L-1}\sum_{m=0}^{M_i-1} c_{l,i+L,m}(a_i b_{i,m}^H) \end{bmatrix},$$ (Eq. 4)

where for a given i, the number of basis vectors is $M_i$ and the corresponding basis vectors are $\{b_{i,m}\}$. Note that $M_i$ is the number of coefficients $c_{l,i,m}$ reported by the UE for a given i, where $M_i \leq M$ (where $\{M_1\}$ or $\Sigma M_i$ is either fixed, configured by the gNB or reported by the UE).

The columns of $W^l$ are normalized to norm one. For rank R or R layers ($\upsilon = R$), the pre-coding matrix is given by $$W^{(R)} = \frac{1}{\sqrt{R}}[W^1 \ W^2 \ \ldots \ W^R].$$

Eq. 2 is assumed in the rest of the disclosure. The embodiments of the disclosure, however, are general and are also applicable to Eq. 1, Eq. 3 and Eq. 4.

$L \leq 2N_1N_2$ and $K \leq N_3$. If $L=2N_1N_2$, then A is an identity matrix, and hence not reported. Likewise, if $K=N_3$, then B is an identity matrix, and hence not reported. Assuming $L<2N_1N_2$, in an example, to report columns of A, the oversampled DFT codebook is used. For instance, $a_i = v_{l,m}$, where the quantity $v_{l,m}$ is given by:

$$u_m = \begin{cases} \begin{bmatrix} 1 & e^{j\frac{2\pi m}{O_2 N_2}} & \cdots & e^{j\frac{2\pi m(N_2-1)}{O_2 N_2}} \end{bmatrix} & N_2 > 1 \\ 1 & N_2 = 1 \end{cases}$$

$$v_{l,m} = \begin{bmatrix} u_m & e^{j\frac{2\pi l}{O_1 N_1}} u_m & \cdots & e^{j\frac{2\pi l(N_1-1)}{O_1 N_1}} u_m \end{bmatrix}^T.$$

Similarly, assuming $K<N_3$, in an example, to report columns of B, the oversampled DFT codebook is used. For instance, $b_k = w_k$, where the quantity $w_k$ is given by:

$$w_k = \begin{bmatrix} 1 & e^{j\frac{2\pi k}{O_3 N_3}} & \cdots & e^{j\frac{2\pi k(N_3-1)}{O_3 N_3}} \end{bmatrix}.$$

In another example, discrete cosine transform DCT basis is used to construct/report basis B for the $3^{rd}$ dimension. The m-th column of the DCT compression matrix is simply given by $$[W_f]_{nm} = \begin{cases} \frac{1}{\sqrt{K}}, & n = 0 \\ \sqrt{\frac{2}{K}} \cos\frac{\pi(2m+1)n}{2K}, & n = 1, \ldots K-1 \end{cases}, \text{ and}$$

$K = N_3$, and $m = 0, \ldots, N_3 - 1$.

Since DCT is applied to real valued coefficients, the DCT is applied to the real and imaginary components (of the channel or channel eigenvectors) separately. Alternatively, the DCT is applied to the magnitude and phase components (of the channel or channel eigenvectors) separately. The use of DFT or DCT basis is for illustration purpose only. The disclosure is applicable to any other basis vectors to construct/report A and B.

Also, in an alternative, for reciprocity-based Type II CSI reporting, a UE is configured with higher layer parameter CodebookType set to 'TypeII-PortSelection-Compression' or 'TypeIII-PortSelection' for an enhanced Type II CSI reporting with port selection in which the pre-coders for all SBs and for a given layer l=1, . . . , v, where v is the associated RI value, is given by $W^l = AC_l B^H$, where $N_1$, $N_2$, $N_3$, and $c_{l,i,k}$ are defined as above except that the matrix A comprises port selection vectors. For instance, the L antenna ports per polarization or column vectors of A are selected by the index $q_1$, where $$q_1 \in \left\{0, 1, ..., \left\lceil \frac{P_{CSI-RS}}{2d} \right\rceil - 1\right\}$$

(this requires $$\left\lceil \log_2 \left\lceil \frac{P_{CSI-RS}}{2d} \right\rceil \right\rceil \text{ bits),}$$

and the value of d is configured with the higher layer parameter PortSelectionSamplingSize, where $$d \in \{1, 2, 3, 4\} \text{ and } d \leq \min\left(\frac{P_{CSI-RS}}{2}, L\right).$$

To report columns of A, the port selection vectors are used, For instance, $a_i = v_m$, where the quantity $v_m$ is a $P_{CSI-RS}/2$-element column vector containing a value of 1 in element (m mod $P_{CSI-RS}/2$) and zeros elsewhere (where the first element is element 0).

On a high level, a precoder $W^l$ can be described as follows.

$$W^l = A C_l B^H = W_1 \tilde{W}_2 W_f^H, \quad (5)$$

where $A = W_1$ corresponds to the $W_1$ in Type II CSI codebook, i.e., $$W_1 = \begin{bmatrix} A & 0 \\ 0 & A \end{bmatrix} \text{ and } B = W_f.$$

The $C = \tilde{W}_2$ matrix consists of all the required linear combination coefficients (e.g., amplitude and phase or real or imaginary). Each reported coefficient ($c_{l,i,m} = p_{l,i,m} \phi_{l,i,m}$) in $\tilde{W}_2$ is quantized as amplitude coefficient ($p_{l,i,m}$) and phase coefficient ($\phi_{l,i,m}$).

In one example, the amplitude coefficient ($p_{l,i,m}$) is reported using an A-bit amplitude codebook where A belongs to $\{2, 3, 4\}$. If multiple values for A are supported, then one value is configured via higher layer signaling. In another example, the amplitude coefficient ($p_{l,i,m}$) is reported as $p_{l,i,m} = p_{l,i,m}^{(1)} p_{l,i,m}^{(2)}$ where:

$p_{l,i,m}^{(1)}$ is a reference or first amplitude which is reported using a A1-bit amplitude codebook where A1 belongs to $\{2, 3, 4\}$, and $p_{l,i,m}^{(2)}$ is a differential or second amplitude which is reported using a A2-bit amplitude codebook where A2≤A1 belongs to $\{2, 3, 4\}$.

For layer l, let us denote the linear combination (LC) coefficient associated with spatial domain (SD) basis vector (or beam) $i \in \{0, 1, ..., 2L_l-1\}$ and frequency domain (FD) basis vector (or beam) $m \in \{0, 1, ..., M_l-1\}$ as $c_{l,i,m}$, and the strongest coefficient as $c_{l,i^*,m^*}$. Here, ($L_l$, $M_l$) denotes the number of SD and FD basis vectors for layer l. In one example, $L_l = L$. The strongest coefficient is reported out of the $K_{NZ,l}$ non-zero (NZ) coefficients that are reported using a bitmap of length $2L_l M_l$, where $K_{NZ,l} \leq K_{0,l} = \lceil \beta_l \times 2L_l M_l \rceil < 2L_l M_l$ and $\beta_l$ is higher layer configured. In one example, $\beta_l = \beta$ for rank 1-2. In one example, $\beta_l$ for rank>2 is either fixed (based on $\beta$ for rank 1-2) or higher layer configured. The remaining $2L_l M_l - K_{NZ,l}$ coefficients that are not reported by the UE are assumed to be zero.

In one example, the following quantization scheme is used to quantize/report the $K_{NZ,l}$ NZ coefficients for each layer l.

The UE reports the following for the quantization of the NZ coefficients in $\tilde{W}_2$:
A $X_l$-bit strongest coefficient indicator ($SCI_l$) for the strongest coefficient index (i*, m*)
Strongest coefficient $c_{l,i^*,m^*} = 1$ (hence its amplitude/phase are not reported).
Two antenna polarization-specific reference amplitudes:
For the polarization associated with the strongest coefficient $c_{l,i^*,m^*} = 1$, since the reference amplitude $p_{l,i,m}^{(1)} = 1$, it is not reported.)
For the other polarization, reference amplitude $p_{l,i,m}^{(1)}$ is quantized to 4 bits
The 4-bit amplitude alphabet is $$\left\{1, \left(\frac{1}{2}\right)^{\frac{1}{4}}, \left(\frac{1}{4}\right)^{\frac{1}{4}}, \left(\frac{1}{8}\right)^{\frac{1}{4}}, ..., \left(\frac{1}{2^{14}}\right)^{\frac{1}{4}},\right.$$

"reserved"}.
For $\{c_{l,i,m}, (i, m) \neq (i^*, m^*)\}$:
For each polarization, differential amplitudes $p_{l,i,m}^{(2)}$ of the coefficients calculated relative to the associated polarization-specific reference amplitude and quantized to 3 bits.
The 3-bit amplitude alphabet is $$\left\{1, \frac{1}{\sqrt{2}}, \frac{1}{2}, \frac{1}{2\sqrt{2}}, \frac{1}{4}, \frac{1}{4\sqrt{2}}, \frac{1}{8}, \frac{1}{8\sqrt{2}}\right\}.$$

Note: The final quantized amplitude $p_{l,i,m}$ is given by $p_{l,i,m}^{(1)} \times p_{l,i,m}^{(2)}$.
Each phase is quantized to either 8PSK ($N_{ph}=8$) or 16PSK ($N_{ph}=16$) (which is configurable).

In the rest of the disclosure, an index m and an index f are used interchaeably to indicate an FD/TD index taking a value from $\{0, 1, ..., M-1\}$ or $\{0, 1, ..., M_f-1\}$. Likewise, $c_{l,i,m}$ and $c_{l,i,f}$ are used interchangeably for a coefficient. Likewise, $c_{l,i^*,m^*}$ and $c_{l,i^*,f^*}$ are used interchangeably for a strongest coefficient.

A UE can be configured to report M FD basis vectors. In one example, $$M = \left\lceil p \times \frac{N_3}{R} \right\rceil,$$

where R is higher-layer configured from $\{1,2\}$ and p is higher-layer configured from $\{1/4, 1/2\}$. In one example, the p value is higher-layer configured for rank 1-2 CSI reporting. For rank>2 (e.g., rank 3-4), the p value (denoted by $v_0$) can be different. In one example, for rank 1-4, (p, $v_0$) is jointly configured from $\{(1/2, 1/4), (1/4, 1/4), (1/4, 1/8)\}$, i.e.

$$M = \left\lceil p \times \frac{N_3}{R} \right\rceil$$

for rank 1-2 and $$M = \left\lceil v_0 \times \frac{N_3}{R} \right\rceil$$

for rank 3-4.

A UE can be configured to report M FD basis vectors in one-step from $N_3$ orthogonal DFT basis vectors freely (independently) for each layer l∈{0, 1, ..., v−1} of a rank v CSI reporting. Alternatively, a UE can be configured to report M FD basis vectors in two-step as follows:

In step 1, an intermediate set (InS) comprising $N'_3 < N_3$ basis vectors are selected/reported, wherein the InS is common for all layers.

In step 2, for each layer l∈{0, 1, ..., v−1} of a rank v CSI reporting, M FD basis vectors are selected/reported freely (independently) from $N'_3$ basis vectors in the InS.

In one example, a one-step method is used when $N_3 \leq 19$ and a two-step method is used when $N_3 > 19$. In one example, $N'_3 = \lceil \alpha M \rceil$ where $\alpha > 1$ is configurable.

The codebook parameters used in the DFT based frequency domain compression (eq. 5) are (L, p, $v_0$, β, α, $N_{ph}$). In one example, the set of values for these codebook parameters are as follows:

L: the set of values is {2,4} in general, except L∈{2,4,6} for rank 1-2, 32 CSI-RS antenna ports, and R=1.

p for rank 1-2, and (p, $v_0$) for rank 3-4: p∈{¼,½} and (p, $v_0$)∈{(½,¼), (¼,¼), (¼,⅛)}.

β∈{¼,½,¾}.
α∈{1.5,2,2.5,3}
$N_{ph}$∈{8,16}.

This disclosure extends the DFT-based (frequency domain) compression according to the framework in equation (5) to spatial domain port selection. In particular, a UE is configured with higher layer parameter CodebookType set to 'TypeII-PortSelection-Compression' or 'TypeIII-PortSelection' for an enhanced Type II CSI reporting with port selection in which the pre-coders for all SBs and for a given layer l=1, ..., v, where v is the associated RI value, is given by $W^l = AC_l B^H$, where $N_1$, $N_2$, $N_3$, and $c_{l,i,k}$ are defined as above except that the matrix A comprises port selection vectors to selection L antenna ports. In one example, this port selection is common for the two antenna polarizations. The rest of the disclosure proposes several embodiments for rank 1-4 CSI reporting according to this extension to port selection.

In embodiment 1, for rank 1-2 CSI reporting, the value of L is configured with the higher layer parameter numberOfBeams, where L=2 when $P_{CSI-RS}$=4 and L∈{2,3,4} when $P_{CSI-RS}$>4. Alternatively, the value of L is configured with the higher layer parameter numberOfBeams, where L=2 when $P_{CSI-RS}$=4 and L∈{2,4} when $P_{CSI-RS}$>4. Alternatively, the value of L is configured with the higher layer parameter numberOfBeams, where L=2 when $P_{CSI-RS}$=4, L∈{2,4} when $P_{CSI-RS}$>4 and $P_{CSI-RS}$≠32, and L∈{2,4,6} when $P_{CSI-RS}$=32.

For rank 3-4 CSI reporting, the value of L is configured with the higher layer parameter numberOfBeams, where L=2 when $P_{CSI-RS}$=4 and L∈{2,3,4} when $P_{CSI-RS}$>4. Alternatively, the value of L is configured with the higher layer parameter numberOfBeams, where L=2 when $P_{CSI-RS}$=4 and L∈{2,4} when $P_{CSI-RS}$>4.

In embodiment 2, for rank 1-2 CSI reporting, the L antenna ports per polarization or column vectors of A are selected by the index $q_1$, where $$q_1 \in \left\{0, 1, ..., \left\lceil \frac{P_{CSI-RS}}{2d} \right\rceil - 1\right\}$$

(this requires $$\left\lceil \log_2 \left\lceil \frac{P_{CSI-RS}}{2d} \right\rceil \right\rceil \text{ bits}),$$

and the value of d is configured with the higher layer parameter PortSelectionSamplingSize, where d∈{1,2,3,4} and $$d \leq \min\left(\frac{P_{CSI-RS}}{2}, L\right).$$

In one example, the index $q_1$ is reported via PMI index $i_{1,1}$. To report columns of A, the port selection vectors are used, For instance, $a_i = v_m$, where the quantity $v_m$ is a $P_{CSI-RS}/2$-element column vector containing a value of 1 in element (m mod $P_{CSI-RS}/2$) and zeros elsewhere (where the first element is element 0). Note that for rank 2, the L antenna port selection vectors are layer-common, i.e., they are common for the two layers 0-1 of rank 2 CSI reporting. The port selection matrix is given by $$W_1 = \begin{bmatrix} X & 0 \\ 0 & X \end{bmatrix} \text{ where } X = \begin{bmatrix} v_{i_{1,1}d} & v_{i_{1,1}d+1} & \cdots & v_{i_{1,1}d+L-1} \end{bmatrix}. \quad (6)$$

In embodiment 3, for rank v∈{3,4} CSI reporting, the L antenna ports per polarization or column vectors of A are selected as follows. For layers 0 and 1, the L antenna ports per polarization or column vectors of A are selected, similar to embodiment 2, by the index $q_1$, where $$q_1 \in \left\{0, 1, ..., \left\lceil \frac{P_{CSI-RS}}{2d} \right\rceil - 1\right\}$$

(this requires $$\left\lceil \log_2 \left\lceil \frac{P_{CSI-RS}}{2d} \right\rceil \right\rceil \text{ bits}),$$

and the value of d is configured with the higher layer parameter PortSelectionSamplingSize, where d∈{1,2,3,4} and $$d \leq \min\left(\frac{P_{CSI-RS}}{2}, L\right).$$

In one example, the index $q_1$ is reported via PMI index $i_{1,1}$. To report columns of A, the port selection vectors are used, For instance, $a_i = v_m$, where the quantity $v_m$ is a $P_{CSI-RS}/2$-element column vector containing a value of 1 in element (m mod $P_{CSI-RS}/2$) and zeros elsewhere (where the first element is element 0).

For layer 2 and v−1, the L antenna ports per polarization or column vectors of A are selected according to at least one of the following alternatives (Alt).

In one alternative Alt 3-0, the value of L and d are configured common for all layers, i.e., they are the same for both layer pair (0, 1) and layer pair (2, 3). The port selection matrix $W_1$ is according to at least one of the following sub-alternatives.

In one alternative Alt 3-0-0, the port selection matrix $W_1$ is common (hence, remains the same) for all layers regardless of the rank value. The PMI i1,1 indicates this common $W_1$ for all layers.

In one alternative Alt 3-0-1, the port selection matrix $W_1$ is layer-pair common, i.e., one $W_{1,1}$ for layer pair (0, 1) and another $W_{1,2}$ for layer pair (2, 3), where $W_{1,1}$ can be different from $W_{1,1}$. In this case, the PMI i1,1 indicates $W_{1,1}$ for layer 0-1 (same as Rel. 15), and a separate PMI, e.g., i1,2, indicates $W_{1,2}$ for layer 2-3, where for $k \in \{0,1\}$, we have $$W_{1,k} = \begin{bmatrix} X_k & 0 \\ 0 & X_k \end{bmatrix} \text{ and } X_k = \begin{bmatrix} v_{i_{1,k}d} & v_{i_{1,k}d+1} & \cdots & v_{i_{1,k}d+L-1} \end{bmatrix}.$$

Alternatively, i1,1 indicates both $W_{1,1}$ and $W_{1,2}$ jointly. Alternatively, $i_{1,1}=[i_{1,1,1} \; i_{1,1,2}]$ where $i_{1,1,k}$ indicates $W_{1,k}$.

In one example, the port selection matrix $W_1$ is according to Alt 3-0-1 when L=2 and is according to Alt 3-0-0 when L>2, for example, when L=4.

In one alternative Alt 3-1, the value of L is configured common for all layers, i.e., they are the same for both layer pair (0, 1) and layer pair (2, 3), but the value of d is configured common for layer pair (0, 1) and another value $d_2$ is used for layer pair (2, 3). Let us define $d_1=d$. The port selection matrix $W_1$ is layer-pair common, i.e., one $W_{1,1}$ for layer pair (0, 1) and another $W_{1,2}$ for layer pair (2, 3), where $W_{1,1}$ is different from $W_{1,1}$. In this case, the PMI i1,1 indicates $W_{1,1}$ for layer 0-1 (same as Rel. 15), and a separate PMI, e.g., i1,2, indicates $W_{1,2}$ for layer 2-3, where for $k \in \{0,1\}$, we have $$W_{1,k} = \begin{bmatrix} X_k & 0 \\ 0 & X_k \end{bmatrix} \text{ and } X_k = \begin{bmatrix} v_{i_{1,k}d} & v_{i_{1,k}d+1} & \cdots & v_{i_{1,k}d+L-1} \end{bmatrix}.$$

Alternatively, i1,1 indicates both $W_{1,1}$ and $W_{1,2}$ jointly. Alternatively, $i_{1,1}=[i_{1,1,1} \; i_{1,1,2}]$ where $i_{1,1,k}$ indicates $W_{1,k}$. The $(d_1, d_2)$ is determined according to at least one of the following alternatives.

In one alternative Alt 3-1-0: the value of $d_1$ is configured the same way as in Rel. 15 (i.e., via higher layer signaling), and the value of $d_2$ is determined based on the configured value of $d_1$. For example, $d_2=\max(1, d_1-1)$.

In one alternative Alt 3-1-1: both $d_1$ and $d_2$ are configured, e.g., via higher layer signaling, either jointly using a single parameter or separately using two separate parameters.

In one alternative Alt 3-1-2: the value of $d_2$ is reported by the UE. This report can be either jointly using an existing CSI parameter (e.g., PMI) or separately using a new separate CSI parameter.

In one alternative In Alt 3-2, the value of d is configured common for all layers, i.e., they are the same for both layer pair (0, 1) and layer pair (2, 3), but the value of L is configured common for layer pair (0, 1) and another value $L_2$ is used for layer pair (2, 3). Let us define $L_1=L$. The port selection matrix $W_1$ is layer-pair common, i.e., one $W_{1,1}$ for layer pair (0, 1) and another $W_{1,2}$ for layer pair (2, 3), where $W_{1,1}$ is different from $W_{1,1}$. In this case, the PMI i1,1 indicates $W_{1,1}$ for layer 0-1 (same as Rel. 15), and a separate PMI, e.g., i1,2, indicates $W_{1,2}$ for layer 2-3, where for $k \in \{0,1\}$, we have $$W_{1,k} = \begin{bmatrix} X_k & 0 \\ 0 & X_k \end{bmatrix} \text{ and } X_k = \begin{bmatrix} v_{i_{1,k}d} & v_{i_{1,k}d+1} & \cdots & v_{i_{1,k}d+L-1} \end{bmatrix}.$$

Alternatively, i1,1 indicates both $W_{1,1}$ and $W_{1,2}$ jointly. Alternatively, $i_{1,1}=[i_{1,1,1} \; i_{1,1,2}]$ where $i_{1,1,k}$ indicates $W_{1,k}$. The $(L_1, L_2)$ is determined according to at least one of the following alternatives.

In one alternative Alt 3-2-0: the value of $L_1$ is configured the same way as in Rel. 15 (i.e., via higher layer signaling), and the value of $L_2$ is determined based on the configured value of $L_1$. For example, $L_2=\max(1, L_1-1)$.

In one alternative Alt 3-2-1: both $L_1$ and $L_2$ are configured, e.g., via higher layer signaling, either jointly using a single parameter or separately using two separate parameters.

In one alternative Alt 3-2-2: the value of $L_2$ is reported by the UE. This report can be either jointly using an existing CSI parameter (e.g., PMI) or separately using a new separate CSI parameter.

In embodiment 4, for rank $v \in \{3,4\}$ CSI reporting, the parameters $L_1$ and $d_1$ are used for layer pair (0, 1) and parameters $L_2$ and $d_2$ are used for layer pair (2, 3). For $k \in \{0,1\}$, the $L_k$ antenna ports per polarization or column vectors of A are selected, similar to embodiment 2, by the index $q_{1,k}$, where $$q_{1,k} \in \left\{ 0, 1, \ldots, \left\lceil \frac{P_{CSI-RS}}{2d_k} \right\rceil - 1 \right\}$$

(this requires $$\left\lceil \log_2 \left\lceil \frac{P_{CSI-RS}}{2d_k} \right\rceil \right\rceil \text{ bits).}$$

The index $q_1=[q_{1,1} \; q_{1,2}]$ is reported either jointly or separately.

At least one of the following alternatives is used for $(d_1, d_2)$.

In one alternative Alt 4-0, the value of d is configured, e.g., via higher layer parameter PortSelectionSamplingSize, and $d_1$ and $d_2$ are derived based on the configured value of d. At least one of the following examples is used.

In one example Ex 4-0-0:

$$d_1 = \left\lceil \frac{d}{2} \right\rceil, d_2 = \max\left(d - \left\lceil \frac{d}{2} \right\rceil\right) \text{ or } \max\left(1, \left\lfloor \frac{d}{2} \right\rfloor\right)$$

In one example Ex 4-0-1:

$$d_1 = \max\left(1, \left\lfloor \frac{d}{2} \right\rfloor\right), d_2 = \max\left(d - \left\lfloor \frac{d}{2} \right\rfloor\right) \text{ or } \left\lceil \frac{d}{2} \right\rceil$$

In one example Ex 4-0-2: $d_2=2$, $d_1=\max(1, d-d_2)$
In one example Ex 4-0-3: $d_2=1$, $d_1=\max(1, d-d_2)$
In one alternative Alt 4-1, the value of d and $d_1$ are configured, e.g., via higher layer parameter PortSelection- SamplingSize and PortSelectionSamplingSize-d1, respectively, and $d_2$ is derived based on the configured value of d and $d_1$. The value of $d_2$ is fixed, e.g., to $d_2=\max(1, d-d_1)$.

In one alternative Alt 4-2, the value of d and $d_2$ are configured, e.g., via higher layer parameter PortSelectionSamplingSize and PortSelectionSamplingSize-d2, respectively, and $d_1$ is derived based on the configured value of d and $d_2$. The value of $d_1$ is fixed, e.g., to $d_1=\max(1, d-d_2)$.

In one alternative Alt 4-3, the value of $d_1$ and $d_2$ are configured, e.g., via higher layer parameter PortSelectionSamplingSize-d1 and PortSelectionSamplingSize-d2, respectively.

At least one of the following alternatives is used for ($L_1$, $L_2$).

In one alternative Alt 4-4, the value of L is configured, e.g., via higher layer parameter numberOfBeams, and $L_1$ and $L_2$ are derived based on the configured value of L. At least one of the following examples is used.

In one example Ex 4-4-0:

$$L_1 = \left\lceil \frac{L}{2} \right\rceil, L_2 = L - L_1 \text{ or } \left\lfloor \frac{L}{2} \right\rfloor.$$

In one example Ex 4-4-1:

$$L_2 = \left\lceil \frac{L}{2} \right\rceil, L_1 = L - L_2 \text{ or } \left\lfloor \frac{L}{2} \right\rfloor.$$

In one example Ex 4-4-2: $L_2=2$, $L_1=\max(2, L-L_2)$.
In one example Ex 4-4-3: $L_2=1$, $L_1=\max(1, L-L_2)$.

In one alternative Alt 4-5, the value of L and $L_1$ are configured, e.g., via higher layer parameter numberOfBeams and numberOfBeams-L1, respectively, and $L_2$ is derived based on the configured value of L and $L_1$. The value of $L_2$ is fixed, e.g., to $L_2=L-L_1$.

In one alternative Alt 4-6, the value of L and $L_2$ are configured, e.g., via higher layer parameter numberOfBeams and numberOfBeams-L2, respectively, and $L_1$ is derived based on the configured value of L and $L_2$. The value of $L_1$ is fixed, e.g., to $L_1=L-L_2$.

In one alternative Alt 4-7, the value of $L_1$ and $L_2$ are configured, e.g., via higher layer parameter numberOfBeams-L1 and numberOfBeams-L2, respectively.

In embodiment 5, the rank $v \in \{3,4\}$ CSI reporting is supported based on a certain condition.

In one example Ex 5-0: the condition is based on the value of L, for example, the value of L is fixed to 4.

In one example Ex 5-1: the condition is based on the value of d, for example, the value of d is restricted to 4 or a value from {3, 4}.

In one example Ex 5-2: the condition is based on the number of ports, $P_{CSI-RS}$, for example, the rank 3-4 port selection is supported only $P_{CSI-RS} > x$, where x is fixed, e.g., to x=4 or 8 or 16.

In one example Ex 5-3: the condition is based on a combination of L, d, or/and $P_{CSI-RS}$.

In another example, the set of values for the codebook parameters (L, p, $v_0$, β, α, $N_{ph}$) are as follows: α=2, $N_{ph}$=16, and

| L | p = $y_0$ (RI = 1-2) | p = $v_0$ (RI = 3-4) | β | Restriction (if any) |
|---|---|---|---|---|
| 2 | ¼ | ⅛ | ¼ | |
| 2 | ¼ | ⅛ | ½ | |

-continued

| L | p = $y_0$ (RI = 1-2) | p = $v_0$ (RI = 3-4) | β | Restriction (if any) |
|---|---|---|---|---|
| 4 | ¼ | ⅛ | ¼ | |
| 4 | ¼ | ⅛ | ½ | |
| 4 | ½ | ¼ | ½ | |
| 6 | ¼ | — | ½ | RI = 1-2, 32 ports |
| 4 | ¼ | ¼ | ¾ | |
| 6 | ¼ | — | ¾ | RI = 1-2, 32 ports |

The above-mentioned framework (equation 5) represents the precoding-matrices for multiple ($N_3$) FD units using a linear combination (double sum) over 2L SD beams and M FD beams. This framework can also be used to represent the precoding-matrices in time domain (TD) by replacing the FD basis matrix $W_f$ with a TD basis matrix $W_t$, wherein the columns of $W_t$ comprises M TD beams that represent some form of delays or channel tap locations. Hence, a precoder $W^l$ can be described as follows.

$$W = A_l C_l B_l^H = W_1 \tilde{W}_2 W_t^H. \tag{5A}$$

In one example, the M TD beams (representing delays or channel tap locations) are selected from a set of $N_3$ TD beams, i.e., $N_3$ corresponds to the maximum number of TD units, where each TD unit corresponds to a delay or channel tap location. In one example, a TD beam corresponds to a single delay or channel tap location. In another example, a TD beam corresponds to multiple delays or channel tap locations. In another example, a TD beam corresponds to a combination of multiple delays or channel tap locations.

The rest of disclosure is applicable to both space-frequency (equation 5) and space-time (equation 5A) frameworks.

In general, for layer l=0,1, . . . , v−1, where v is the rank value reported via RI, the pre-coder (cf. equation 5 and equation 5A) includes the codebook components summarized in Table 1 (when a strongest coefficient is not included in the codebook) and in Table 2 (when a strongest coefficient is included in the codebook).

TABLE 1

Codebook Components

| Index | Components | Description |
|---|---|---|
| 0 | $L_l$ | number of SD beams |
| 1 | $M_l$ | number of FD/TD beams |
| 2 | $\{a_{l,i}\}_{i=0}^{L_l-1}$ | set of SD beams comprising columns of $A_l$ |
| 3 | $\{b_{l,m}\}_{m=0}^{M_l-1}$ | set of FD/TD beams comprising columns of $B_l$ |
| 4 | $\{x_{l,i,m}\}$ | bitmap indicating the indices of the non-zero (NZ) coefficients |
| 5 | $\{p_{l,i,m}\}$ | amplitudes of NZ coefficients indicated via the bitmap |
| 6 | $\{\phi_{l,i,m}\}$ | phases of NZ coefficients indicated via the bitmap |

TABLE 2

Codebook Components

| Index | Components | Description |
|---|---|---|
| 0 | $\{a_{l,i}\}_{i=0}^{L_l-1}$ | set of SD beams comprising columns of $A_l$ |
| 1 | $\{b_{l,m}\}_{m=0}^{M_l-1}$ | set of FD/TD beams comprising columns of $B_l$ |
| 2 | (i*, m*) | an index of a strongest coefficient $c_{l,i^*,m^*}$ |
| 3 | $\{x_{l,i,m}\}$ | bitmap indicating the indices of the non-zero (NZ) coefficients |

TABLE 2-continued

Codebook Components

| Index | Components | Description |
|---|---|---|
| 4 | $\{p_{l,i,m}\}$ | amplitudes of NZ coefficients indicated via the bitmap |
| 5 | $\{\phi_{l,i,m}\}$ | phases of NZ coefficients indicated via the bitmap |

In one example, the number of SD beams is layer-common, i.e., $L_l$=L for all l values. In one example, the set of SD basis is layer-common, i.e., $a_{l,i}$=$a_i$ for all l values. In one example, the number of FD/TD beams is layer-pair-common or layer-pair-independent, i.e., $M_0$=$M_1$=M for layer pair (0, 1), $M_2$=$M_3$=M' for layer pair (2, 3), and M and M' can have different values. In one example, the set of FD/TD basis is layer-independent, i.e., $\{b_{l,m}\}$ can be different for different l values. In one example, the bitmap is layer-independent, i.e., $\{\beta_{l,i,m}\}$ can be different for different l values. In one example, the coefficients are layer-independent, i.e., $\{c_{l,i,m}=p_{l,i,m}\phi_{l,i,m}\}$ can be different for different l values.

In one example, when the SD basis $W_1$ is a port selection, then the candidate values for L or $L_l$ include 1, and the candidate values for the number of CSI-RS ports N CSI-RS include 2.

This disclosure extends the DFT-based (frequency domain) compression according to the framework in equation (5 or 5A) to SD port selection and/or FD/TD port selection. In one example, for the SD port selection, $A_l$ comprises selection vectors to select L antenna ports (out of $P_{CSIRS}$ CSI-RS antenna ports), where this selection can be common for the two antenna polarizations or different for the two antenna polarizations. In one example, for the FD/TD port selection, $B_l$ comprises selection vectors to select M FD/TD units (out of $N_3$ FD/TD units).

In embodiment 6, a UE is configured with a subset (S1) of the codebook components (either via higher layer RRC signaling or MAC CE based signaling or DCI based signaling). The UE uses the subset (S1) of codebook components and derives a remaining subset (S2) of codebook components (that are not configured to the UE). The UE reports a CSI report including the remaining subset (S2) of codebook components. In one example, the subset (S1) of the codebook components is obtained based on the UL channel estimated using SRS transmission from the UE. The subset S1 of codebook components (configured to the UE) is according to at least one of the following alternatives (Alt) wherein the codebook component indices are as in Table 1.

In one alternative Alt 6-1: the subset S1 includes five codebook components corresponding to indices 0-4

In one alternative Alt 6-2: the subset S1 includes three codebook components corresponding to indices {0, 2, 4}

In one alternative Alt 6-3: the subset S1 includes three codebook components corresponding to indices {1, 3, 4}

In one alternative Alt 6-4: the subset S1 includes four codebook components corresponding to indices 0-3

In one alternative Alt 6-5: the subset S1 includes three codebook components corresponding to indices 2-4

In one alternative Alt 6-6: the subset S1 includes two codebook components corresponding to indices {0, 2}

In one alternative Alt 6-7: the subset S1 includes two codebook components corresponding to indices {1, 3}

In one alternative Alt 6-8: the subset S1 includes two codebook components corresponding to indices {2, 3}

In one alternative Alt 6-9: the subset S1 includes two codebook components corresponding to indices {3, 4}

In one alternative Alt 6-10: the subset S1 includes one codebook component corresponding to index 3.

In one example, all of the remaining subset (S2) of codebook components (that are not configured to the UE) are reported by the UE. For example, when the subset S1 is according to Alt 6-1, then the remaining subset S2 comprises a codebook component, corresponding to index 5, is reported by the UE.

In another example, the remaining subset (S2) of codebook components (that are not configured to the UE) is partitioned into two subsets (S21 and S22), the subset (S21) is reported by the UE and the subset (S22) is fixed. For example, when the subset S1 is according to Alt 6-3, then the remaining subset S2 comprises codebook components, corresponding to indices {0, 2, 5}, and the subset S21 can comprise index {5} and S22 can comprise indices {0, 2}.

In another example, when the subset S1 includes SD basis but not FD/TD basis, then it also includes power level for each of SD beams included in this SD basis. Likewise, when the subset S1 includes FD/TD basis but not SD basis, then it also includes power level for each of FD/TD beams included in this FD/TD basis. When the subset S1 includes both SD basis and FD/TD basis, then it either includes separate power levels for SD and FD bases, i.e., SD power level for each of SD beams included in this SD basis and FD/TD power level for each of FD/TD beams included in this FD/TD basis, or includes a joint power level for all combinations of SD and FD/TD beam combinations. Note that in case of separate power level, the total number of power levels is $2L_l+M_l$ and in case of joint power level, the total number of power levels is $2L_lM_l$.

In embodiment 6A, a variation of embodiment 6, the subset (S1) of the codebook components is reported by the UE in a previous CSI report (e.g., the last reported CSI including the subset S1 of codebook components).

In embodiment 6B, a variation of embodiment 6, the subset (S1) of the codebook components is fixed (hence, neither configured to the UE nor reported by the UE). In this variation, the codebook components in set S1 can be obtained by the gNB (NW) based on the UL channel estimated using SRS transmission from the UE. Likewise, the codebook components in set S1 can be obtained by the UE based on the DL channel estimated using CSI-RS transmission from the gNB. If the codebook components in set S1 are reciprocal between DL and UL channel estimates, then these components need not be reported by the UE (to the gNB) or configured to the UE (by the gNB) since they can be obtained using SRS or CSI-RS transmissions.

In embodiment 7, for SD basis, the set of SD beams $\{a_{l,i}\}_{i=0}^{L_l-1}$ comprising columns of $A_l$ is according to at least one of the following alternatives. The SD basis is common for the two antenna polarizations, i.e., one SD basis is used for both antenna polarizations.

In one alternative Alt 7-1, the SD basis is analogous to the $W_1$ component in Rel.15 Type II port selection codebook, wherein the $L_l$ antenna ports or column vectors of $A_l$ are selected by the index $$q_{1,k} \in \left\{0, 1, \ldots, \left\lceil \frac{P_{CSI-RS}}{2d} \right\rceil - 1\right\}$$

(this requires $$\left\lceil \log_2 \left\lceil \frac{P_{CSI-RS}}{2d} \right\rceil \right\rceil \text{ bits),}$$

where $$d \leq \left( \frac{P_{CSI-RS}}{2}, L_l \right).$$

In one example, d∈{1,2,3,4}. To select columns of $A_l$, the port selection vectors are used, For instance, $a_i = v_m$, where the quantity $v_m$ is a $P_{CSI-RS}/2$-element column vector containing a value of 1 in element (m mod $P_{CSI-RS}/2$) and zeros elsewhere (where the first element is element 0). The port selection matrix is then given by $$W_1 = A_l = \begin{bmatrix} X & 0 \\ 0 & X \end{bmatrix} \text{ where } X = [v_{q_1 d} \ v_{q_1 d+1} \ \cdots \ v_{q_1 d + L_l - 1}].$$

In one alternative Alt 7-2, the SD basis selects $L_l$ antenna ports freely, i.e., the $L_l$ antenna ports per polarization or column vectors of $A_l$ are selected freely by the index $$q_1 \in \left\{ 0, 1, \ldots, \begin{pmatrix} \frac{P_{CSI-RS}}{2} \\ L_l \end{pmatrix} - 1 \right\}$$

(this requires $$\left\lceil \log_2 \begin{pmatrix} \frac{P_{CSI-RS}}{2} \\ L_l \end{pmatrix} \right\rceil \text{ bits).}$$

To select columns of $A_l$, the port selection vectors are used, For instance, $a_i = v_m$, where the quantity $v_m$ is a -element column vector containing a value of 1 in element (m mod $P_{CSI-RS}/2$) and zeros elsewhere (where the first element is element 0). Let $\{x_0, x_1, \ldots, x_{L_l-1}\}$ be indices of selection vectors selected by the index $q_1$. The port selection matrix is then given by $$W_1 = A_l = \begin{bmatrix} X & 0 \\ 0 & X \end{bmatrix} \text{ where } X = [v_{x_0} \ v_{x_1} \ \cdots \ v_{x_{L_l-1}}].$$

In one alternative Alt 7-3, the SD basis selects $L_l$ DFT beams from an oversampled DFT codebook, i.e., $a_i = v_{i_1, i_2}$, where the quantity $v_{i_1, i_2}$ is given by $$u_{i_2} = \begin{cases} \left[ 1 \ e^{j \frac{2\pi m}{O_2 N_2}} \ \cdots \ e^{j \frac{2\pi m (N_2 - 1)}{O_2 N_2}} \right] & N_2 > 1 \\ 1 & N_1 = 1 \end{cases}$$

$$v_{i_1, i_2} = \left[ u_{i_2} \ e^{j \frac{2\pi i_1}{O_1 N_2}} u_{i_2} \ \cdots \ e^{j \frac{2\pi i_1 (N_1 - 1)}{O_1 N_1}} u_{i_2} \right]^T.$$

In one example, this selection of $L_l$ DFT beams is from a set of orthogonal DFT beams comprising $N_1 N_2$ two-dimensional DFT beams.

In embodiment 7A, a variation of embodiment 2, the SD basis is selected independently for each of the two antenna polarizations, according to at least one of Alt 7-1 through Alt 7-3.

In embodiment 8, for FD/TD basis, the set of FD/TD beams $\{b_{l,m}\}_{m=0}^{M_l - 1}$ comprising columns of $B_l$ is according to at least one of the following alternatives.

In one alternative Alt 8-1, the FD/TD basis selection to similar to Alt 7-1, i.e., the $M_l$ FD/TD units ports or column vectors of $B_l$ are selected by the index $$q_2 \in \left\{ 0, 1, \ldots, \left\lceil \frac{N_3}{e} \right\rceil - 1 \right\}$$

(this requires $$\left\lceil \log_2 \left\lceil \frac{N_3}{e} \right\rceil \right\rceil \text{ bits),}$$

where $e \leq \min(N_3, M_l)$. In one example, $e \in \{1,2,3,4\}$. To select columns of $B_l$, the selection vectors are used, For instance, $b_m = v_z$, where the quantity $v_z$ is a $N_3$-element column vector containing a value of 1 in element ($z$ mod $N_3$) and zeros elsewhere (where the first element is element 0). The selection matrix is then given by $$W_f = B_l = [v_{q_2 e} \ v_{q_2 e + 1} \ \cdots \ v_{q_2 e + M_l - 1}].$$

In one alternative Alt 8-2, the FD/TD basis selects $M_l$ FD/TD units freely, i.e., the $M_l$ FD/TD units or column vectors of $B_l$ are selected freely by the index $$q_2 \in \left\{ 0, 1, \ldots, \begin{pmatrix} N_3 \\ M_l \end{pmatrix} - 1 \right\}$$

(this requires $$\left\lceil \log_2 \begin{pmatrix} N_3 \\ M_l \end{pmatrix} \right\rceil \text{ bits).}$$

To select columns of $B_l$, the selection vectors are used, For instance, $b_m = v_z$, where the quantity $v_z$ is a $N_3$-element column vector containing a value of 1 in element ($z$ mod $N_3$) and zeros elsewhere (where the first element is element 0). Let $\{x_0, x_1, \ldots, x_{M_l - 1}\}$ be indices of selection vectors selected by the index $q_2$. The selection matrix is then given by $$W_f = B_l = \left[ v_{x_0} \ v_{x_1} \ \cdots \ v_{x_{M_l - 1}} \right].$$

In one alternative Alt 8-3, the FD/TD basis selects $M_l$ DFT beams from an oversampled DFT codebook, i.e., $b_k = W_k$, where the quantity $w_k$ is given by $$w_k = \left[ 1 \ e^{j \frac{2\pi k}{O_3 N_3}} \ \cdots \ e^{j \frac{2\pi k (N_3 - 1)}{O_3 N_3}} \right].$$

In one example, this selection of $M_l$ DFT beams is from a set of orthogonal DFT beams comprising $N_3$ DFT beams. In one example, $O_3 = 1$.

In embodiment 9, the SD and FD/TD basis is according to at least one of the alternatives in Table 3.

TABLE 3

Alternatives for SD and FD/TD Bases

| Alt | SD basis | FD/TD basis |
|---|---|---|
| 9-0 | Alt 7-1 | Alt 8-1 |
| 9-1 |  | Alt 8-2 |
| 9-2 |  | Alt 8-3 |
| 9-3 | Alt 7-2 | Alt 8-1 |
| 9-4 |  | Alt 8-2 |
| 9-5 |  | Alt 8-3 |
| 9-6 | Alt 7-3 | Alt 8-1 |
| 9-7 |  | Alt 8-2 |
| 9-8 |  | Alt 8-3 |

In embodiment 10, when the FD/TD basis comprising $N'_3$ FD/TD beams is configured to the UE (cf. embodiment 6), then the FD/TD basis selection is according to at least one of the following alternatives.

In one alternative Alt 10-1: when $N'_3 = M_l$, the UE uses the configured FD/TD basis for all layers to determine the rest of the codebook components.

In one alternative Alt 10-2: when $N'_3 > M_l$, the UE uses the configured FD/TD basis as an intermediate basis, common for all layers, and selects $M_l$ out of $N'_3$ bases independently for each layer. The UE reports the selected $M_l$ FD/TD bases in the CSI report together with the other codebook components.

In embodiment 11, when the bitmap indicating X NZ indices is configured to the UE (cf. embodiment 6), then the bitmap selection is according to at least one of the following alternatives.

In one alternative Alt 11-1: when a certain condition is met (e.g., X=t, a threshold value), the UE uses the configured bitmap for all layers to determine the rest of the codebook components.

In one alternative Alt 11-2: when a certain condition is met (e.g., X>t, a threshold value), the UE uses the configured bitmap as an intermediate basis, common for all layers, and selects bitmaps independently for each layer such that the selected NZ coefficients are included in the configured bitmap. The UE reports the selected bitmap in the CSI report together with the other codebook components.

Figure 14:
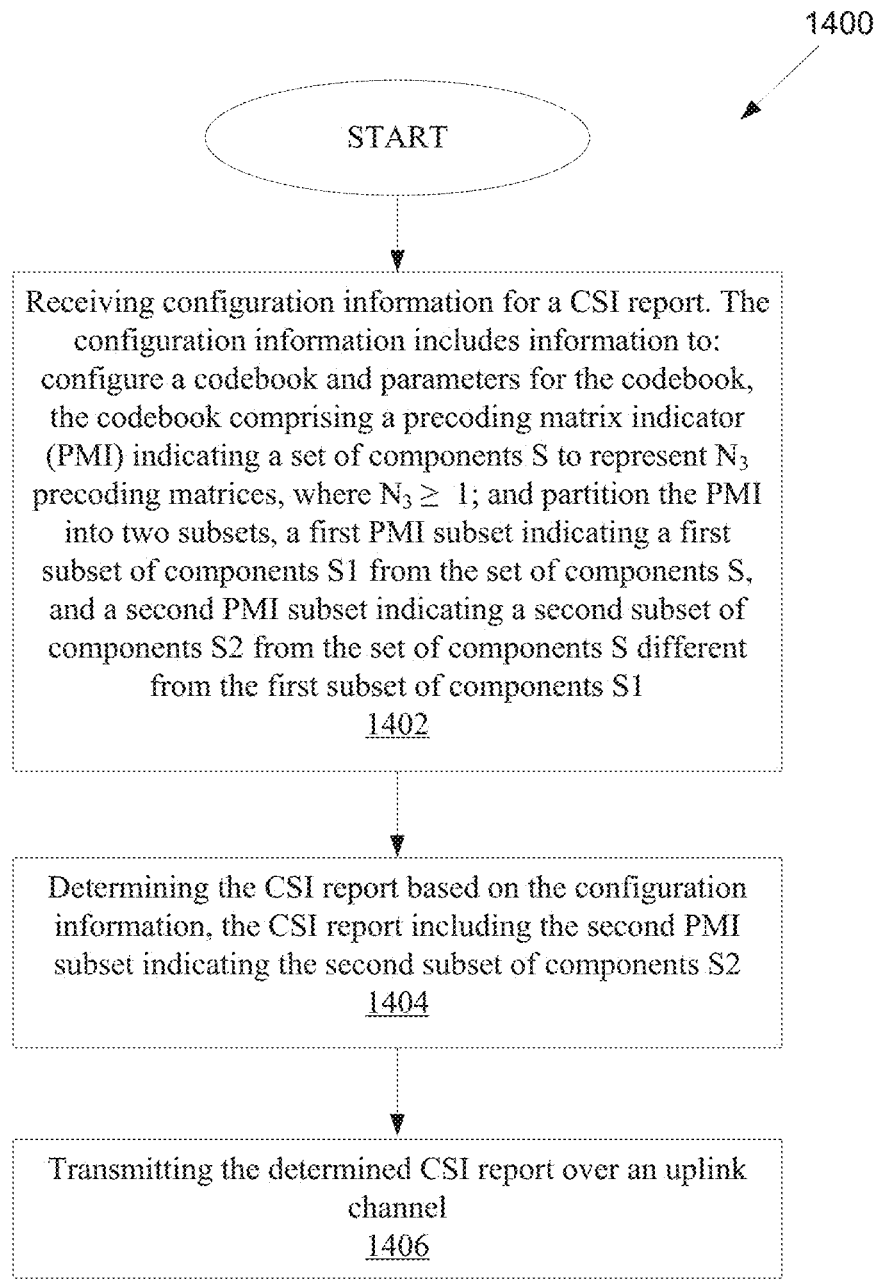
FIG. 14 illustrates a flow chart of a method for operating a UE for CSI reporting in a wireless communication system, as may be performed by a UE, according to embodiments of the present disclosure.

FIG. 14 illustrates a flow chart of a method 1400 for operating a user equipment (UE) for channel state information (CSI) reporting in a wireless communication system, as may be performed by a UE such as UE 116, according to embodiments of the present disclosure. The embodiment of the method 1400 illustrated in FIG. 14 is for illustration only. FIG. 13 does not limit the scope of this disclosure to any particular implementation.

As illustrated in FIG. 14, the method 1400 begins at step 1402. In step 1402, the UE (e.g., 111-116 as illustrated in FIG. 1) receives configuration information for a CSI report. The configuration information includes information to: configure a codebook and parameters for the codebook, the codebook comprising a precoding matrix indicator (PMI) indicating a set of components S to represent $N_3$ precoding matrices, where $N_3 \geq 1$; and partition the PMI into two subsets, a first PMI subset indicating a first subset of components S1 from the set of components S, and a second PMI subset indicating a second subset of components S2 from the set of components S different from the first subset of components S1.

In step 1404, the UE determines the CSI report based on the configuration information, the CSI report including the second PMI subset indicating the second subset of components S2.

In step 1406, the UE transmits the determined CSI report over an uplink (UL) channel.

In one embodiment, the UE receives first PMI subset indicating the first subset of components S1 via higher layer signaling.

In one embodiment, in a prior time slot, the UE determines another CSI report that includes the first PMI subset indicating the first subset of components S1; and transmits the another CSI report in the prior time slot.

In one embodiment, each of the $N_3$ precoding matrices has v columns and an l-th column of the $N_3$ precoding matrices are represented by columns of $$W^l = \frac{1}{\sqrt{v}}\begin{bmatrix} A & 0 \\ 0 & A \end{bmatrix} C_l B_l^H = \begin{bmatrix} \sum_{f=0}^{M-1}\sum_{i=0}^{L-1} c_{l,i,f}(a_i b_{l,f}^H) \\ \sum_{f=0}^{M-1}\sum_{i=0}^{L-1} c_{l,i+L,f}(a_i b_{l,f}^H) \end{bmatrix},$$

where $l \in \{1, \ldots, v\}$ and $v \geq 1$ is a rank value, $A = [a_0 \ a_1 \ \ldots \ a_{L-1}]$, $a_i$ is a $$\frac{P}{2} \times 1$$

column vector whose one entry is 1 and remaining entries are 0, and P is a number of antenna ports in spatial domain (SD), $B_l = [b_{l,0} \ b_{l,1} \ \ldots \ b_{l,M-1}]$, $b_{l,f}$ is a Q×1 column vector, and Q is a number of antenna ports in frequency domain (FD), $C_l$ is a 2L×M matrix comprising coefficients $c_{l,i,f}$ with row index $i \in \{0, 1, \ldots, 2L-1\}$ and column index $f \in \{0, 1, \ldots, M-1\}$; and the set of components S comprises: Component 1: $\{a_i\}_{i=0}^{L-1}$ indicating L SD port selection vectors, and for each $l \in \{1, \ldots, v\}$, Component 2: $\{b_{l,f}\}_{f=0}^{M-1}$ indicating M FD basis vectors, Component 3: Index (i*, f*) indicating an index of a strongest coefficient $c_{l,i^*,f^*}$, Component 4: Bitmap $\{x_{l,i,f}\}$ indicating indices of non-zero (NZ) coefficients of $C_l$, Component 5: Amplitudes $\{p_{l,i,f}\}$ of the NZ coefficients of $C_l$, and Component 6: Phases $\{\phi_{l,i,f}\}$ of the NZ coefficients of $C_l$.

In one embodiment, the first subset of components S1 includes Component 2 and the second subset of components S2 includes Components 1, 3, 4, 5, and 6.

In one embodiment, the first subset of components S1 includes Components 1 and 2 and the second subset of components S2 includes Components 3, 4, 5, and 6.

In one embodiment, $b_{l,f}$ is a FD port selection vector whose one entry is 1 and remaining entries are 0.

In one embodiment, L SD vectors are selected freely from $$\frac{P}{2}$$

candidate SD vectors, and the selected vectors are reported via a $$\left\lceil \log_2\binom{\frac{P}{2}}{L} \right\rceil$$

-bit indicator included in the CSI report.

Figure 15:
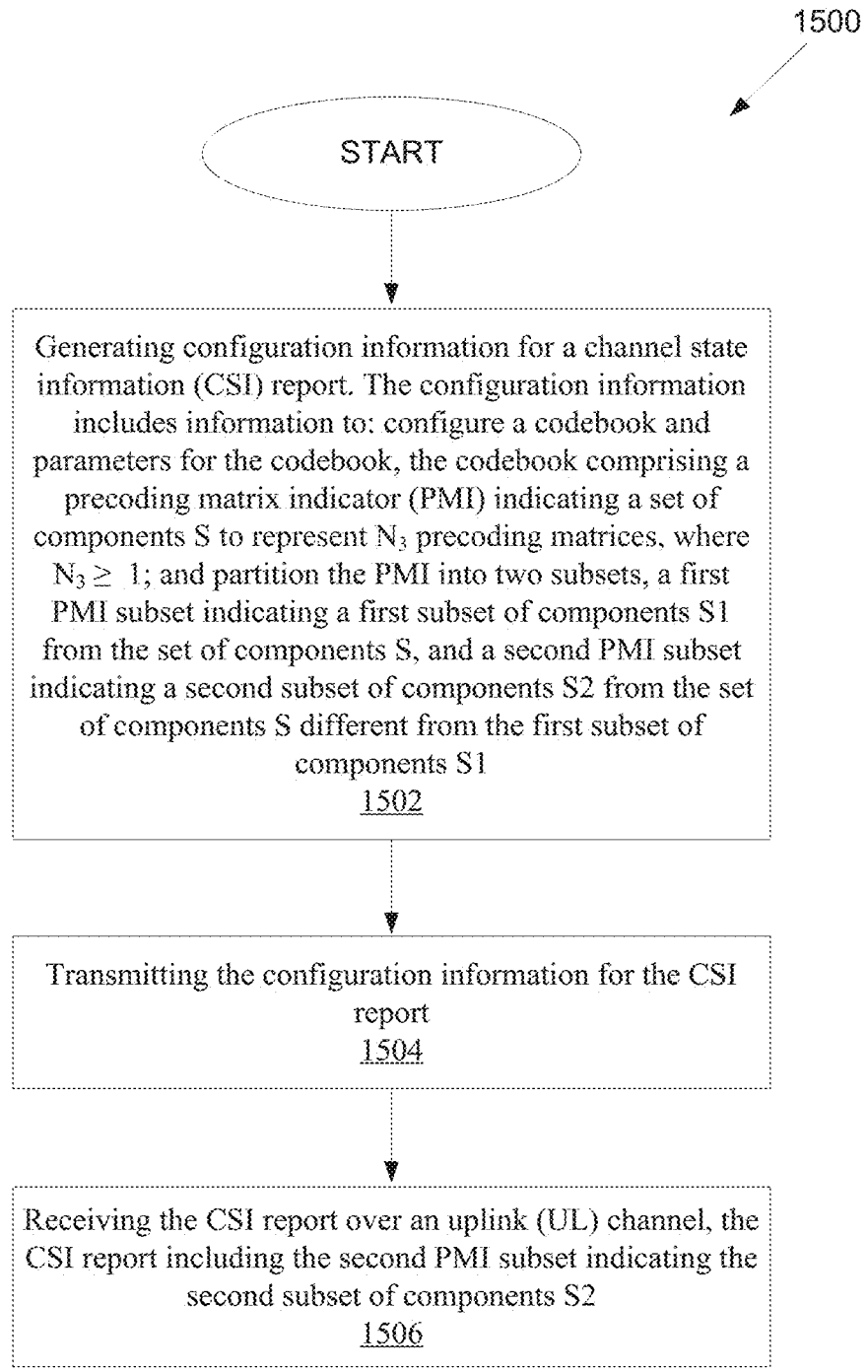
FIG. 15 illustrates a flow chart of a method for receiving a CSI feedback, as may be performed by a BS, according to embodiments of the present disclosure.

FIG. 15 illustrates a flow chart of another method 1500, as may be performed by a base station (BS) such as BS 102, according to embodiments of the present disclosure. The embodiment of the method 1500 illustrated in FIG. 15 is for illustration only. FIG. 15 does not limit the scope of this disclosure to any particular implementation.

As illustrated in FIG. 15, the method 1500 begins at step 1502. In step 1502, the BS (e.g., 101-103 as illustrated in FIG. 1), generates CSI feedback configuration information for a CSI report. The configuration information includes information to: configure a codebook and parameters for the codebook, the codebook comprising a precoding matrix indicator (PMI) indicating a set of components S to represent $N_3$ precoding matrices, where $N_3 \geq 1$; and partition the PMI into two subsets, a first PMI subset indicating a first subset of components S1 from the set of components S, and a second PMI subset indicating a second subset of components S2 from the set of components S different from the first subset of components S1.

In step 1504, the BS transmits the CSI feedback configuration information for the CSI report.

In step 1506, the BS receives the CSI report over an uplink (UL) channel, the CSI report including the second PMI subset indicating the second subset of components S2.

In one embodiment, the BS determines the first PMI subset indicating the first subset of components S1; and transmits the first PMI subset indicating the first subset of components S1 via higher layer signaling.

In one embodiment the first PMI subset indicating the first subset of components S1 is received via another CSI report in a prior time slot.

In one embodiment, each of the $N_3$ precoding matrices has v columns and an l-th column of the $N_3$ precoding matrices are represented by columns of $$W^l = \frac{1}{\sqrt{v}} \begin{bmatrix} A & 0 \\ 0 & A \end{bmatrix} C_l B_l^H = \begin{bmatrix} \sum_{f=0}^{M-1} \sum_{i=0}^{L-1} c_{l,i,f}(a_i b_{l,f}^H) \\ \sum_{f=0}^{M-1} \sum_{i=0}^{L-1} c_{l,i+L,f}(a_i b_{l,f}^H) \end{bmatrix},$$

where $l \in \{1, \ldots, v\}$ and $v \geq 1$ is a rank value, $A = [a_0 \ a_1 \ \ldots \ a_{L-1}]$, $a_i$ is a $$\frac{P}{2} \times 1$$

column vector whose one entry is 1 and remaining entries are 0, and P is a number of antenna ports in spatial domain (SD), $B_l = [b_{l,0} \ b_{l,1} \ \ldots \ b_{l,M-1}]$, $b_{l,f}$ is a Q×1 column vector, and Q is a number of antenna ports in frequency domain (FD), $C_l$ is a 2L×M matrix comprising coefficients $c_{l,i,f}$ with row index $i \in \{0, 1, \ldots, 2L-1\}$ and column index $f \in \{0, 1, \ldots, M-1\}$; and the set of components S comprises: Component 1: $\{a_i\}_{i=0}^{L-1}$ indicating L SD port selection vectors, and for each $l \in \{1, \ldots, v\}$, Component 2: $\{b_{l,f}\}_{f=0}^{M-1}$ indicating M FD basis vectors, Component 3: Index (i*, f*) indicating an index of a strongest coefficient $c_{l,i^*,f^*}$, Component 4: Bitmap $\{x_{l,i,f}\}$ indicating indices of non-zero (NZ) coefficients of $C_l$, Component 5: Amplitudes $\{p_{l,i,f}\}$ of the NZ coefficients of $C_l$, and Component 6: Phases $\{\phi_{l,i,f}\}$ of the NZ coefficients of $C_l$.

In one embodiment, the first subset of components S1 includes Component 2 and the second subset of components S2 includes Components 1, 3, 4, 5, and 6.

In one embodiment, the first subset of components S1 includes Components 1 and 2 and the second subset of components S2 includes Components 3, 4, 5, and 6.

In one embodiment, $b_{l,f}$ is a FD port selection vector whose one entry is 1 and remaining entries are 0.

In one embodiment, L SD vectors are selected freely from $$\frac{P}{2}$$

candidate SD vectors, and the selected vectors are reported via a $$\left\lceil \log_2\binom{\frac{P}{2}}{L} \right\rceil$$

-bit indicator included in the CSI report.

Although the present disclosure has been described with an exemplary embodiment, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A user equipment (UE) comprising:
    a processor; and
    a transceiver operably coupled to the processor, the transceiver configured to:
        receive, from a base station, a radio resource control (RRC) message including configuration information associated with a codebook, and
        transmit, to the base station, a channel state information (CSI) report including a second codebook component based on the configuration information, wherein a first codebook component is identified as a component not reported and wherein the first codebook component is related to $N_3$,
    wherein the $N_3$ is a number related to precoding matrices,
    wherein the second codebook component is related to a $P_{CSI\text{-}Reference\ Signal\ (RS)}/2$ element column vector, and
    wherein $P_{CSI\text{-}RS}$ is a number of CSI-RS ports.

2. The UE of claim 1, wherein the CSI report further includes:
    a third codebook component indicating a strongest coefficient;
    a fourth codebook component indicating a bitmap of at least one non-zero coefficient;
    a fifth codebook component indicating an amplitude of the at least one non-zero coefficient; and
    a sixth codebook component indicating a phase of the at least one non-zero coefficient.

3. The UE of claim 1, wherein:
the $P_{CSI-RS}/2$ column vector includes a value of 1 in an element and zeros elsewhere, and
a first element is an element of index 0.

4. The UE of claim 1, wherein:
the second codebook component corresponds to one of values from 0 to $$\left(\frac{\frac{P_{CSI-RS}}{2}}{L}\right) - 1,$$

and
L is a number of vectors.

5. The UE of claim 1, wherein:
the first codebook component is related to M vectors and each of the M vectors is a length $N_3$ column vector, and
the second codebook component is related to L vectors and each of the L vectors is a $P_{CSI-RS}/2$ element column vector.

6. A method performed by a user equipment (UE), the method comprising:
receiving, from a base station, a radio resource control (RRC) message including configuration information associated with a codebook; and
transmitting, to the base station, a channel state information (CSI) report including a second codebook component based on the configuration information, wherein a first codebook component is identified as a component not reported and wherein the first codebook component is related to $N_3$;
wherein the $N_3$ is a number related to precoding matrices,
wherein the second codebook component is related to a $P_{CSI-Reference\ Signal\ (RS)}/2$ element column vector, and
wherein $P_{CSI-RS}$ is a number of CSI-RS ports.

7. The method of claim 6, wherein the CSI report further includes:
a third codebook component indicating a strongest coefficient;
a fourth codebook component indicating a bitmap of at least one non-zero coefficient;
a fifth codebook component indicating an amplitude of the at least one non-zero coefficient; and
a sixth codebook component indicating a phase of the at least one non-zero coefficient.

8. The method of claim 6, wherein:
the $P_{CSI-RS}/2$ column vector includes a value of 1 in an element and zeros elsewhere, and
a first element is an element of index 0.

9. The method of claim 6, wherein:
the second codebook component corresponds to one of values from 0 to $$\left(\frac{\frac{P_{CSI-RS}}{2}}{L}\right) - 1,$$

and
L is a number of vectors.

10. The method of claim 6, wherein:
the first codebook component is related to M vectors and each of the M vectors is a length $N_3$ column vector, and
the second codebook component is related to L vectors and each of the L vectors is a $P_{CSI-RS}/2$ element column vector.

11. A base station comprising:
a processor; and
a transceiver operably coupled to the processor, the transceiver configured to:
transmit, to a user equipment (UE), a radio resource control (RRC) message including configuration information associated with a codebook; and
receive, from the UE a channel state information (CSI) report including a second codebook component based on the configuration information, wherein a first codebook component is identified as a component not reported and wherein the first codebook component is related to $N_3$;
wherein the $N_3$ is a number related to precoding matrices,
wherein the second codebook component is related to a $P_{CSI-Reference\ Signal\ (RS)}/2$ element column vector, and
wherein $P_{CSI-RS}$ is a number of CSI-RS ports.

12. The base station of claim 11, wherein the CSI report further includes:
a third codebook component indicating a strongest coefficient;
a fourth codebook component indicating a bitmap of at least one non-zero coefficient;
a fifth codebook component indicating an amplitude of the at least one non-zero coefficient; and
a sixth codebook component indicating a phase of the at least one non-zero coefficient.

13. The base station of claim 11, wherein:
the $P_{CSI-RS}/2$ column vector includes a value of 1 in an element and zeros elsewhere, and
a first element is an element of index 0.

14. The base station of claim 11, wherein:
the second codebook component corresponds to one of values from 0 to $$\left(\frac{\frac{P_{CSI-RS}}{2}}{L}\right) - 1,$$

and
L is a number of vectors.

15. The base station of claim 11, wherein:
the first codebook component is related to M vectors and each of the M vectors is a length $N_3$ column vector, and
the second codebook component is related to L vectors and each of the L vectors is a $P_{CSI-RS}/2$ element column vector.

* * * * *